(12) United States Patent
Ozarski et al.

(10) Patent No.: US 11,242,100 B2
(45) Date of Patent: Feb. 8, 2022

(54) OVERHEAD STORAGE DEVICES, SYSTEMS, AND METHODS

(71) Applicant: SPORTS NEST, INC., Poway, CA (US)

(72) Inventors: Robert G. Ozarski, Poway, CA (US); Marc R. Ozarski, San Diego, CA (US)

(73) Assignee: Sports Nest, Inc., Poway, CA (US)

( * ) Notice: Subject to any disclaimer, the term of this patent is extended or adjusted under 35 U.S.C. 154(b) by 0 days.

(21) Appl. No.: 17/211,332

(22) Filed: Mar. 24, 2021

(65) Prior Publication Data

US 2021/0300490 A1    Sep. 30, 2021

Related U.S. Application Data

(60) Provisional application No. 63/000,796, filed on Mar. 27, 2020.

(51) Int. Cl.
| | |
|---|---|
| *B62H 3/02* | (2006.01) |
| *B62H 3/12* | (2006.01) |
| *B66D 1/02* | (2006.01) |
| *B66D 3/04* | (2006.01) |

(52) U.S. Cl.
CPC .............. *B62H 3/02* (2013.01); *B62H 3/12* (2013.01); *B66D 1/02* (2013.01); *B66D 3/04* (2013.01)

(58) Field of Classification Search
CPC ... B62H 3/02; B62H 3/00; B62H 3/04; B62H 3/06; B62H 3/08; B62H 3/12; A47F 7/04; Y10T 70/5876; Y10T 70/5881; B66D 3/04; B66D 1/12; B66D 1/16; B66C 19/00; B25J 9/026; B66F 7/02
See application file for complete search history.

(56) References Cited

U.S. PATENT DOCUMENTS

| | | | |
|---|---|---|---|
| 7,370,843 B2 * | 5/2008 | Dueck ..................... | B62H 3/12 254/277 |
| 2012/0068133 A1 * | 3/2012 | Ozarski ................... | B62H 3/12 254/364 |

* cited by examiner

*Primary Examiner* — Ko H Chan
(74) *Attorney, Agent, or Firm* — Manuel de la Cerra

(57) ABSTRACT

An overhead storage device or system may include a mechanism for hoisting the object to be stored (e.g., a bicycle) at an elevated height (e.g., above grade or floor level). In general, the present teachings may include a cable pulley engaged with a constant torque spring unit structurally configured to apply an approximately constant torque to the cable spool that promotes rotation of a spool thereof for winding of a lift cable about the spool to lift a load. Also disclosed are techniques for improving such a constant toque lifting unit such as an inertial brake structurally configured to slow down or stop an undesired, accelerated winding of a lift cable, a self-coiling device structurally configured to advantageously wind the lift cable a predetermined amount (e.g., for removal of same as a hinderance), and an attachment mechanism structurally configured to securely couple to a load.

20 Claims, 12 Drawing Sheets

OVERHEAD STORAGE DEVICES, SYSTEMS, AND METHODS

CROSS-REFERENCE TO RELATED APPLICATIONS

This application claims priority to U.S. Provisional Application No. 63/000,796 filed on Mar. 27, 2020, the entire content of which is hereby incorporated by reference herein in its entirety.

This application is also related to U.S. patent application Ser. No. 13/235,326 filed on Sep. 16, 2011 (published as U.S. Patent App. Pub. No. 2012/0068133), and U.S. patent application Ser. No. 14/544,511 filed on Apr. 14, 2015 (published as U.S. Patent App. Pub. No. 2020/0354204), where each of the foregoing is hereby incorporated by reference herein in its entirety (and where each of the foregoing is included as an Appendix hereto).

FIELD

The present disclosure generally relates to storage devices, systems, and methods, and in particular to overhead storage devices that can be used, by way of example, for storing bicycles and the like in an elevated position.

BACKGROUND

Many families in the United States own one or more bicycles, but only a small portion of the population regularly ride their bicycles. Many bicycles in the United States are in storage, often with flat tires and rusty chains. To accommodate these bicycles and other similar items, many different storage devices have been proposed, but they often include cumbersome and inefficient mechanics.

There remains a need for improved overhead storage techniques, e.g., for bicycles and the like.

SUMMARY

An overhead storage device or system may include a mechanism for hoisting the object to be stored (e.g., a bicycle) at an elevated height (e.g., above grade or floor level). In general, the present teachings may include a cable pulley engaged with a constant torque spring unit structurally configured to apply an approximately constant torque to the cable spool that promotes rotation of a spool thereof for winding of a lift cable about the spool to lift a load. Also disclosed are techniques for improving such a constant toque lifting unit such as an inertial brake structurally configured to slow down or stop an undesired, accelerated winding of a lift cable, a self-coiling device structurally configured to advantageously wind the lift cable a predetermined amount (e.g., for removal of same as a hinderance), and an attachment mechanism structurally configured to securely couple to a load.

In an aspect, an overhead storage system disclosed herein may include: a cable pulley; a constant torque spring unit coupled to the cable pulley, the constant torque spring unit structurally configured to apply an approximately constant torque to the cable pulley that promotes rotation thereof for winding of a lift cable; and a brake unit engaged with a spool of one or more of the cable pulley and the constant torque spring unit for slowing the winding of the lift cable. The brake unit may include: a rotor engaged with the spool such that rotation of the rotor corresponds to rotation of the spool, the rotor including a first side including a first engagement area structurally configured to engage with one or more engagement surfaces disposed on the spool, the rotor movable along the one or more engagement surfaces of the spool from a first position to a second position via an inertial force experienced by the rotor from a predetermined rotation of the spool, and a second side including a second engagement area; a plate having a first side engaged with a fixed member restricting rotation of the plate and a second side including a mating surface structurally configured for engagement with the second engagement area of the rotor; a spring disposed between the rotor and the plate, the spring biasing the rotor toward its first position, and the spring compressible to allow movement of the rotor to its second position where the mating surface of the plate engages with the second engagement area of the rotor to restrict rotation of the rotor; and a damper engaged with the plate, the damper structurally configured to absorb at least a portion of a torsional force applied by the rotor.

Implementations may include one or more of the following features. The damper may include a spiral spring that is at least partially wound by the torsional force. The rotation of the rotor in its second position may cause rotation of the plate until torque of the spiral spring is substantially equal to the torsional force and torque exerted by the constant torque spring unit on the spool. The first engagement area of the rotor may include one or more first rotor teeth. One or more engagement surfaces of the spool may include one or more helical surfaces sized and shaped to permit the one or more first rotor teeth to move along the one or more helical surfaces in a predetermined manner when traversing between the first position and the second position. The mating surface of the plate may include one or more plate teeth, and where the second engagement area of the rotor includes one or more second rotor teeth structurally configured to engage with the one or more plate teeth. Engagement of one or more of the plate teeth and one or more of the second rotor teeth may permit rotation of the rotor in a first direction but may limit rotation of the rotor in a second direction, the second direction corresponding to the direction of the predetermined rotation of the spool. The spool engaged with the brake unit may be a lifting spool of the constant torque spring unit. Rotation of the rotor in a first direction opposite a direction of the predetermined rotation of the spool may cause the rotor to move from the second position to the first position.

In an aspect, an overhead storage system disclosed herein may include: a cable pulley including a first cable spool and a lift cable having a first end portion coupled to the first cable spool, the cable pulley engaged with a constant torque spring unit structurally configured to apply an approximately constant torque to the first cable spool that promotes rotation of the first cable spool for winding of the lift cable about the first cable spool; and a self-coiling device coupled to a second end portion of the lift cable. The self-coiling device may include: a second spool about which at least a portion of the lift cable is windable, the second spool rotatable in a first direction to unwind at least the portion of the lift cable from the second spool through a lowering of the self-coiling device; a spiral spring coupled to the second spool such that rotation of the second spool in the first direction causes a tensioning of the spiral spring, the tensioning of the spiral spring establishing no greater than a maximum torque on the second spool selected to rotate the second spool a predetermined amount in a second direction opposite the first direction and to thereby coil the lift cable about the second spool thereby raising the self-coiling device; and an actuator movable from a first position where the second spool is prevented from rotating in the second direction when the spiral spring is tensioned to a second position where the second spool is permitted to rotate in the second direction through a release of the tensioning of the spiral spring. The overhead storage system may also include an attachment mechanism engaged to the self-coiling device and structurally configured to couple with a load.

Implementations may include one or more of the following features. The self-coiling device may further include a wheel engaged with the second spool, and where the actuator is engaged with the wheel in the first position to lock the wheel and thereby the second spool from rotating in the second direction. Moving the actuator to the second position may unlock the wheel and thereby the second spool thus causing torque from the spiral spring to rotate the second spool thereby coiling the lift cable about the second spool and raising the self-coiling device. The actuator may be biased toward the first position, where movement of the actuator to the second position requires a force to overcome this biasing. Applying the force on the actuator may move the actuator to the second position thereby causing a raising of the self-coiling device, where releasing the force on the actuator causes movement of the actuator to the first position thereby selectively stopping the raising of the self-coiling device. The actuator may include a button that is depressible by a user of the overhead storage system.

In an aspect, an overhead storage system disclosed herein may include: a cable pulley including a first cable spool and a lift cable having a first end portion coupled to the first cable spool, the cable pulley engaged with a constant torque spring unit structurally configured to apply an approximately constant torque to the first cable spool that promotes rotation of the first cable spool for winding of the lift cable about the first cable spool; and an attachment mechanism disposed toward a second end portion of the lift cable and movable with the lift cable via the cable pulley. The attachment mechanism may include: a strap including a free end insertable and selectively lockable within a cavity of the attachment mechanism, the strap forming a self-tensioning loop when the free end is locked within the cavity and a load is inserted within the loop; a gate movable between an open position and a locked position, the open position exposing an entryway providing access to the free end of the strap when disposed within the cavity, and the locked position blocking the entryway; a linkage engaged with a portion of the gate such that rotational movement of the linkage moves the gate between the open position and the locked position; and a button engaged with the linkage, the button movable between a first position and a second position, and the linkage movable with the button such that the first position corresponds to the locked position of the gate and the second position corresponds to the open position of the gate.

Implementations may include one or more of the following features. Each of the linkage and the button may be pivotable about an axis disposed through a case of the attachment mechanism. The system may further include a first spring biasing the button toward the first position. The system may further include a second spring biasing the linkage to move the gate into the locked position. The system may further include a tab on a case of the attachment mechanism, the tab restricting movement of the button within a predetermined range.

These and other features, aspects, and advantages of the present teachings will become better understood with reference to the following description, examples, and appended claim(s).

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
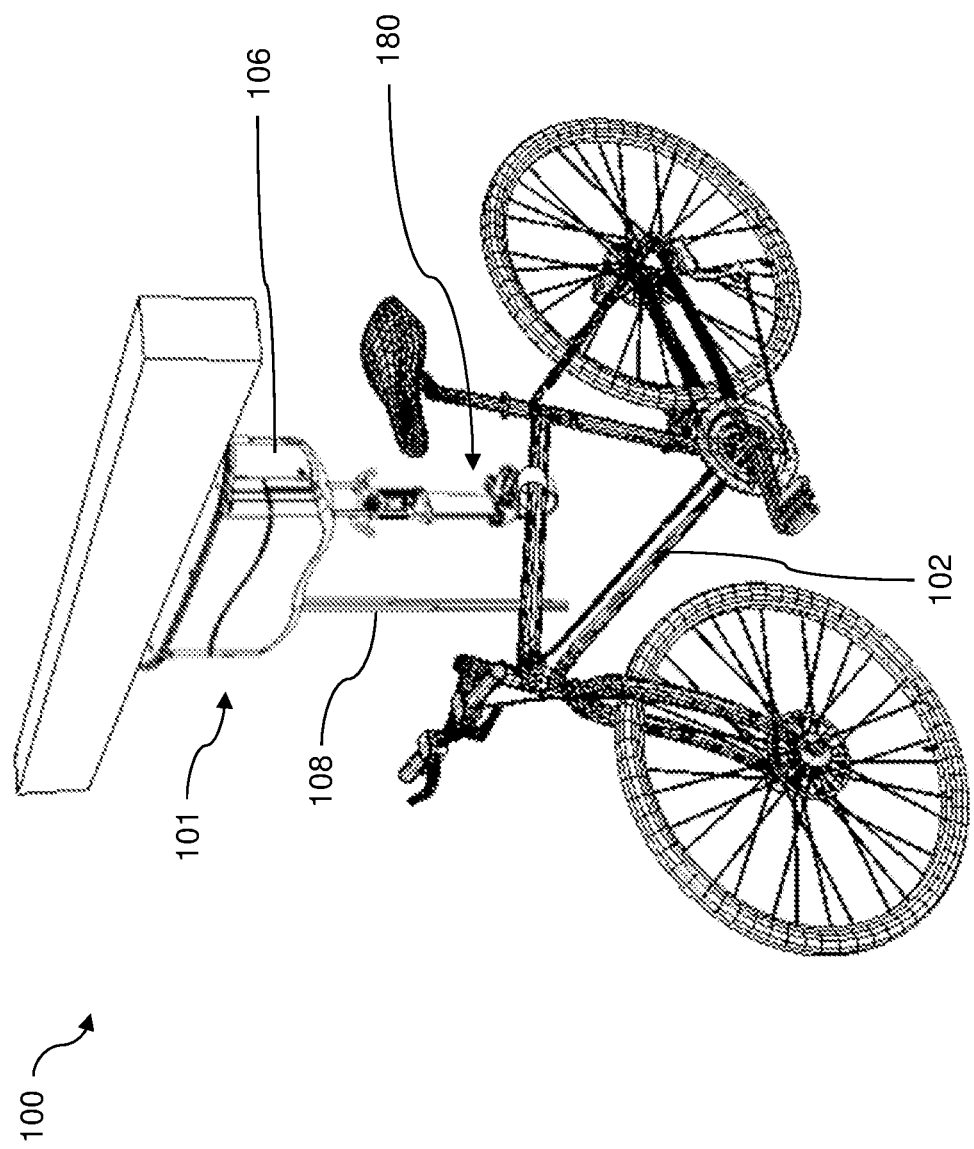
FIG. 1 illustrates an overhead storage system, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," "above," "below," "raise," "lower," "clockwise," "counterclockwise," and the like, are words of convenience and are not to be construed as limiting terms unless specifically stated to the contrary.

Before describing the present teachings, some background information may be helpful. Example patents covering bicycle storage include the following: U.S. Pat. Nos. 3,872,972; 6,161,207; 3,907,113; and 5,183,162, where each of the foregoing is hereby incorporated by reference herein in its entirety. U.S. Pat. No. 3,872,972 appears to include a rack for hanging a bicycle above the floor and a counterweight to ease the effort associated with raising the bicycle. Another, U.S. Pat. No. 7,370,843 (which is hereby incorporated by reference herein in its entirety) appears to disclose a retractable load support system with a constant torque spring for providing an approximately constant torque to a spool arranged to lift a load like a bicycle for overhead storage and a gerotor "for dampening the raising of [the load] in a relatively fast manner which can damage the [load or the support system]." A gerotor is a special fluid pump that can add considerably to the cost of the system, and in the system of U.S. Pat. No. 7,370,843, the fluid appears to be merely circulated to dissipate energy so as to slow down the lifting of the load. Many of the aforementioned devices seek to store bicycles in spaces not needed for other uses, such as up above floor spaces, for example, by hanging the bicycle from a ceiling in a garage, above normal automobile spaces.

In related U.S. patent application Ser. No. 13/235,326 (filed on Sep. 16, 2011, and published as U.S. Patent App. Pub. No. 2012/0068133) and U.S. patent application Ser. No. 14/544,511 (filed on Apr. 14, 2015 and published as U.S. Patent App. Pub. No. 2020/0354204), the applicant described the operation of a device for lifting a load such as a bicycle and for securing the load to a lift cable to lift the load. The present teachings describe, inter alia, several improvements to these aforementioned disclosures, which can provide manufacturing, operational, and/or performance advantages. It will be understood that the present teachings may thus include items that replace or augment these aforementioned disclosures.

In particular, the present teachings may include an overhead storage device and/or system. It will be understood that the present teachings may be described as a "device," "unit," "system," or the like depending on context, but that these terms may be used interchangeably herein. This is because the present teachings may include many features that are advantageous for overhead storage solutions, where one or more of these features can work together to provide a particular solution for a user. As such, one or more of these features can be present in a single unit (which can be referred to as a "device") and/or one or more of these features can be included as separate aspects of a conglomerate (which can be referred to herein as a "system"). Thus, unless explicitly stated to the contrary or otherwise clear from the context, it will be understood that aspects of the present teachings may be referred to interchangeably as a device, unit, or system.

The present teachings may be particularly suited for storing items commonly stored in a shop, shed, and/or garage—such as bicycles, golf clubs, yard equipment, skis, and the like—where these items would typically occupy floor space, often preventing or diminishing the ability to otherwise utilize this floor space, e.g., floor space that can be used to park an automobile in a garage. In particular, the present teachings may include a mechanism for hoisting a load above floor level (e.g., above grade). It will generally be understood that the term "load" as used herein shall refer to an object to be stored, such as a bicycle or the like. The present teachings may include a cable with an attachment mechanism at one end of the cable, where the cable is partially wound on a spool thereby forming a cable pulley. A constant torque spring may be structurally configured to apply an approximately constant torque to the spool of the cable pulley. This approximately constant torque may continuously cause the cable, unless restrained, to be further wound on the spool. The present teachings may also or instead include a particularly-tailored locking mechanism that allows an attachment mechanism and an attached load to be lowered and locked at any desired position within the range of the cable pulley. In certain embodiments, the locking mechanism may include a pawl and ratchet unit structurally configured to restrain any lifting of the load unless a release arm is activated, e.g., via pulling of a release cord (or the like) attached to the release arm, where the release arm is connected to the pawl by a torsion spring. The activation of the release arm may be structurally configured to cause a rotational force to be applied to the pawl which may initiate step one of a two-step release process. The second step may include a downward force applied to the load such that it descends slightly. This second action may cause the pawl to unlock from the ratchet allowing a load to ascend. This two-step feature can prevent an accidental release of the locking mechanism, which could damage the load and/or the storage device or a user.

As discussed herein, the present teachings may be used for moving (e.g., lifting) and storing a load such as a bicycle or the like, although other loads are also or instead possible for use with the present teachings as will be understood by a skilled artisan. Thus, where a bicycle is used by way of example herein, it will be understood that, unless explicitly stated to the contrary or otherwise clear from context, a bicycle may be substituted or supplemented with another type of load. Bicycles can provide a useful example of a load for use with the present teachings because bicycles can provide a unique challenge to attach to a lifting storage device, as they can have a relatively large variety of shapes, sizes, and/or geometries (e.g., angles of their cross bars). Modern bicycles are relatively expensive with some costing upwards of $10,000, and they may be composed of materials ranging from metal to bamboo to carbon fiber and more. The present teachings may thus generally describe an attachment device that accommodates a wide range of objects to hold these objects securely, e.g., without causing any damage. In particular, a load attachment device described herein may preferably hold a bicycle along its cross bar or frame member, which may be angled significantly and have a variety of shapes and sizes, where the load attachment device is structurally configured to couple with the load such as a bicycle and not to slide along the cross bar or frame member as the bicycle is raised.

Certain implementations of the present teachings include a cable pulley; a constant torque spring unit attached to a cable spool of the cable pulley and structurally configured to apply an approximately constant torque to the cable spool; a cable partially wound at least partially around the cable spool and having an attachment mechanism at one end of the cable; a coiling mechanism that is structurally configured to wind up the cable (e.g., when the cable has been lowered and not attached); and a locking mechanism. An aspect of the present teachings may be structurally configured to permit the attachment mechanism and an attached load to be lowered and locked at any desired position within the range of the device, where an approximately constant torque applied by the constant torque spring is structurally configured to continuously cause the cable, unless restrained, to be further wound on the cable spool. It will be understood that the use of the phrase "approximately constant torque" of a constant torque spring unit is meant to refer to torque that varies by less than plus or minus 10 percent over the range of the spring. A preferred locking mechanism of an aspect of the present teachings may include a pawl and ratchet unit that preferably includes a release cord connected to the pawl such that the pawl and ratchet unit can restrain rotation of the spool unless the release cord has been pulled downward with a downward force and the load is simultaneously pushed slightly downward—e.g., thereby forming a two-step operation for unlocking the unit. A constant torque spring unit of the present teachings may include a constant torque spring, a storage spool, and a lifting spool, where the spring is wrapped around the storage spool and the lifting spool in reverse directions so as to create a nearly constant torque on the storage spool and the cable spool. Certain embodiments may also or instead include a holding feature for holding the locking mechanism in an unlocked position while the cable is wound around the cable pulley and while a load is being raised, and a load release feature for allowing the raising and lowering of the load. Certain embodiments may include a method for resetting the holding feature to a holding configuration when the load is lowered, thereby allowing the load to descend but preventing the load from raising unless the release process described above is performed, or another release process is performed.

Certain embodiments may also or instead include an inertial brake structurally configured to stop rotation of the cable pulley during a rapid, undesirous acceleration of the cable pulley. Certain embodiments may also or instead include a mechanism for raising the lift cable when there is no load attached to it, thereby getting it out of the way for a user when it is not in use. Certain embodiments may also or instead include a load attachment device, which can use the weight of the object being lifted to secure the object. A strap may be structurally configured to minimize any damage to expensive or structurally awkward loads such as bicycles.

Figure 2:
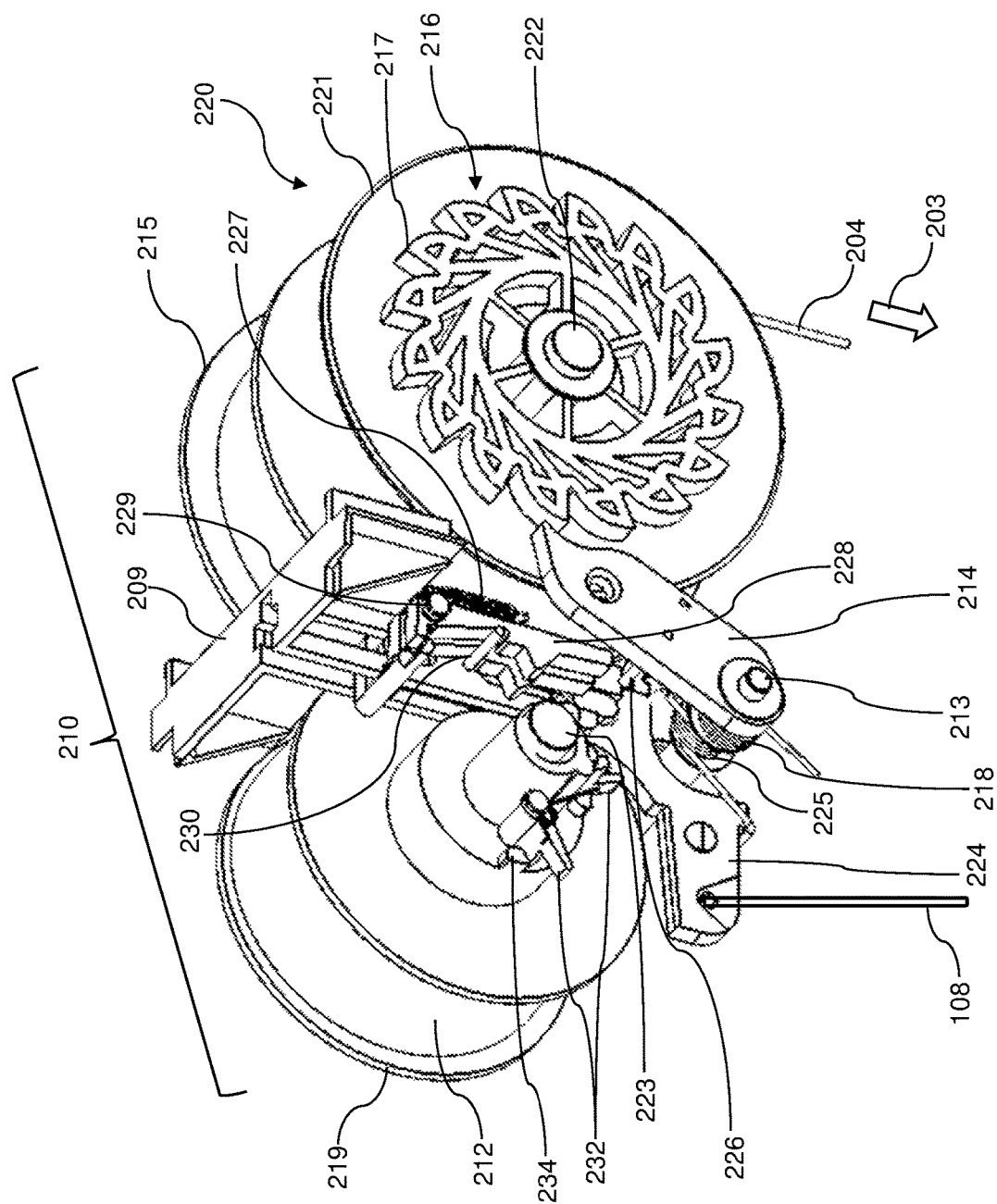
FIG. 2 illustrates a portion of an overhead storage system, in accordance with a representative embodiment.

FIG. 1 illustrates an overhead storage system, in accordance with a representative embodiment, and FIG. 2 illustrates a portion of an overhead storage system, in accordance with a representative embodiment. The system 100 in FIG. 1 may generally include an overhead storage unit 101 (which may be contained within a housing 106), a release cord 108, a load attachment device 180, and a load 102. Specifically, FIG. 1 shows a system 100 featuring an overhead storage unit 101, which may allow a load 102 such as a bicycle to be lifted by a constant torque spring unit 210 featuring a constant torque spring 212 (see FIG. 2) from its standing/resting position on the ground to an elevated position at the top of the lifting device's travel for storage (or at various heights in-between). The load 102 may be attached via a load attachment device 180, as shown in FIG. 1, to a lift cable 204 (see FIG. 2) suspended by a cable pulley 220. One or more of the aforementioned components may be wholly or partially contained and/or mounted in a housing 106 (e.g., in the form of a support case shown in FIG. 1), e.g., through a shaft 222 or the like as shown in FIG. 2, or through another structure thereof such as a bridge gate 209 or other structure or frame.

The constant torque spring unit 210 may include a constant torque spring 212 that is structurally configured to supply a force slightly greater than the weight of the load 102 (e.g., a bicycle), such that the load 102 will rise until the maximum lift height is reached, the load 102 substantially reaches the ceiling, or the load 102 is otherwise interrupted from lifting. On example of a constant torque spring 212 is available from Vulcan Springs, Inc. with offices in Telford, Pa.

In an aspect, the load 102 may be lowered by manually applying a relatively small amount of downward force (i.e., in the direction indicated by the arrow 203 in FIG. 2), by pulling downward on the load 102 and/or the load attachment device 180 shown in FIG. 1. As the load 102 of FIG. 1 is lowered, a pawl 214 (shown in FIG. 2) may rotate slightly (in a counterclockwise direction in FIG. 2) as it rides over the top of the teeth 217 in ratchet 216 when it rotates in an opposite direction (in a clockwise direction in FIG. 2). This activity may allow the lift cable 204 to descend (by rotation of, and unwinding from, the cable pulley 220), but when the downward force is stopped, the lift cable 204 will tend to rise due to the torque applied to it by the constant torque spring 212, which may be acting to rotate the cable pulley 220 in a winding direction (a counterclockwise direction in FIG. 2). This may cause the pawl 214 to engage the ratchet 216, which may itself be biased toward the ratchet 216. That is, a first torsion spring 218 may apply a force (in a clockwise direction in FIG. 2) to the pawl 214. The first torsion spring 218 may be mounted around a pawl axel 213 with one end attached to the pawl 214 and the other end held by the housing 106 or other structure of the overhead storage unit 101 (see FIG. 1). It will be understood that the descriptions of rotation herein (e.g., clockwise and counterclockwise) are provided by example and for convenience, and that other directions of rotation may be used (e.g., the opposite directions of the example directions provided herein).

The engaging of the pawl 214 with the ratchet 216 may prevent a cable spool 221 of the cable pulley 220 from rotating in at least one direction and thus the lift cable 204 (and load) from rising. The pawl 214 may be positioned such that an arc from its pivot position (along the pawl axel 213)—this arc having a radius equal to the distance from the pawl axel 213 to an apex of the pawl 214 opposite the pawl axel 213)—will intersect the circumference of a root circle of the ratchet 216 that includes teeth 217 along this circumference. The position at which the pawl 214 stops the rotation of the ratchet 216 (and thus the cable spool 221 of the cable pulley 220) may be where the lower intersection of these two circles occurs. This action may allow a load to be stopped at any point in its travel, e.g., when a downward force applied by a user is halted. With the pawl 214 engaged with (e.g., within or in-between) the teeth 217 of the ratchet 216, the load 102 can be removed from the load attachment device 180 of FIG. 1, and the load attachment device 180 may remain at whatever height above the floor in which it was positioned. The lift cable 204 may be wound around the cable spool 221 of the cable pulley 220 (and attached to the cable spool 221). And, as shown in FIG. 2, the cable spool 221 (or more generally, the cable pulley 220) may be engaged with a lifting spool 215 of the constant torque spring unit 210, which in turn is coupled to the constant torque spring 212. Thus, in an aspect, the constant torque spring unit 210 includes a constant torque spring 212 and a lifting spool 215.

The constant torque spring unit 210 shown in FIG. 2 may be wholly or partially contained within the housing 106 of FIG. 1, and as shown in FIG. 2, may generally include a constant torque spring 212 wound around two spools—the lifting spool 215 and a storage spool 219, although other configurations are also or instead possible as will be understood by a skilled artisan. The lifting spool 215 and the storage spool 219 may be supported by respective axle shafts, such as the shaft 222 and a second shaft 223 shown in FIG. 2. A portion of the constant torque spring 212 may be coiled about the lifting spool 215 and a portion may be coiled about the storage spool 219 in the reverse rotation. This reversal of the winding from the lifting spool 215 to the storage spool 219 may create a nearly constant torque (e.g., plus or minus about 10%) on the lifting spool 215, which is transferred to the cable spool 221 by its connection to the lifting spool 215. The torque transferred to the cable spool 221 may generate a force that tends to wind the lift cable 204 about the cable spool 221 to thereby lift a load within the lifting limits of the torque supplied by the constant torque spring 212. The constant torque spring 212 may be structurally configured such that the torque it generates in combination with the radius of the cable spool 221 produces a force that is slightly greater than the weight of an intended load (a bicycle, for example) to be lifted.

In this manner, it will be understood that the maximum lifting capability may be determined by the choice of one or more of the spring parameters, spool diameters, and the like. For a given constant torque spring 212, the lifting torque and thereby the load lifting capability of the device can be adjusted to suit the intended load by adjusting the diameter of the cable spool 221, for example. This can be accomplished in a variety of ways, for example by replacing the cable spool 221 with a suitable diameter for the load, by adding or removing a cylindrical sleeve to the base of the cable spool 221 to increase its diameter, and/or by winding a material about the cable spool 221 upon which the lift cable 204 rides on top of, thereby increasing the effective radius as experienced by the lift cable 204. Other techniques are also or instead possible.

The constant torque spring unit 210 may provide a nearly constant torque (e.g., plus or minus about 10%) independent of the number of turns on the lifting and storage spools; this can create a nearly constant force on the lift cable 204, which may consistently be tending to lift the object load. To lower the load, a downward force may be applied by a user, and when this force overcomes the force of the constant torque spring 212 applied to the cable spool 221 such that it unwinds the lift cable 204, this may cause the load to descend. This may wind further turns of the constant torque spring 212 onto the lifting spool 215 as the load is lowered.

In a standard operation, the constant torque spring 212 may be coiled about the storage spool 219 with only a few turns about the lifting spool 215. Continuing with this example, as the load is lowered (e.g., from its uppermost position), it winds an increasing portion of the constant torque spring 212 about the lifting spool 215, which supplies torque to the cable spool 221 and thereby provides a force to resist the weight of the object load attached to the lift cable 204, in effect counter-balancing the load. During lowering of the load, the pawl 214 may not be engaged into the ratchet 216 that is coupled to the cable spool 221, but may ride along the top edge of the teeth 217 of the ratchet 216 as it rotates clockwise. When the load reaches a desired height and the downward force applied by the user is released, the cable spool 221 may tend to rotate (in a counterclockwise direction in FIG. 2) due to the force of the constant torque spring 212. This may cause one of the teeth 217 of the ratchet 216 to engage with the pawl 214 thereby preventing the ratchet 216 from turning (in a counterclockwise direction in FIG. 2) and thereby preventing upward travel of the lift cable 204. In certain aspects, this locking action may allow a load 102 to be lowered to approximately any desired height, and may allow for the load 102 to be removed from the load attachment device 180 shown in FIG. 1 at any position along its travel.

Turning back to FIG. 2, to lift a load, the pawl 214 may be disengaged from the ratchet 216, and disposed away from the teeth 217 of the ratchet 216. The mechanism described in U.S. patent application Ser. No. 13/235,326 (filed on Sep. 16, 2011 and published as U.S. Patent App. Pub. No. 2012/0068133) and U.S. patent application Ser. No. 14/544,511 (filed on Apr. 14, 2015 and published as U.S. Patent App. Pub. No. 2020/0354204) may successfully provide that function. However, in some circumstances, that mechanism may prove difficult to manufacture to the required tolerance. Therefore, an alternate mechanism is described herein, where this alternate mechanism may overcome certain manufacturing difficulties and thereby may provide a more reliable release mechanism in production volume. This may be accomplished in the following manner. Allowing a load to travel upward may include a two-step sequence. First, the user may pull down on a release cord 108 or the like (e.g., any mechanism that can activate a release of the pawl 214), whereupon this release cord 108 may be held down in a releasing position to remain there unless otherwise acted upon. Then, the user may push down slightly on the load to enable a lifting action. When the user pulls down on the release cord 108—which may be coupled to a release arm 224—this may correspondingly pull the release arm 224 down, which may cause a portion of the release arm 224 (or a component coupled thereto) to slide within one or more slots of a bridge gate 209, or to otherwise pivot or move about a fixed, rigid structure of the overall unit. As the release arm 224 slides downward, the release arm 224 (or a component coupled thereto) may push down on a leg or other portion of a second torsion spring 225 (or a component coupled thereto) thereby placing the second torsion spring 225 in tension. Activation of the release arm 224 may also cause the first torsion spring 218 to be put in tension, e.g., in implementations where the first torsion spring 218 comes into contact with a first pin 226 or the like, causing the first torsion spring 218 to tend to wind (in a counterclockwise direction in FIG. 2). Accordingly, the first torsion spring 218 may be extended thereby putting it in tension. These springs may generally be resisting the downward pull on the release cord 108 and the downward motion of the release arm 224. As the release arm 224 travels downward, one or more swing arms 228 (e.g., two swing arms 228 are shown in FIG. 2, where they are connected via a second pin 229, about which the swing arms 228 are pivotable) may pivot about the second pin 229 and be pressed against a third pin 230 by one or more torsion springs engaged to the swing arms 228 (e.g., about, or in the vicinity of, the second pin 229). When the release arm 224 reaches the end of its travel and the user stops pulling down on the release cord 108, the release arm 224 may tend to rise due to the tension of one or more of the springs of the unit—e.g., the tension spring 227, the first torsion spring 218, and the second torsion spring 225. As the release arm 224 rises, one or more of the swing arms 228 (which may be swung forward) may be secured within a notch (or other feature thereof) under the third pin 230 (and thus, one or more of the swing arms 228 may be shaped to include features that can engage with the other components described herein such as the third pin 230). The notch in one of the swing arms 228 may be slightly lower than the notch in another, adjacent swing arm such that it is not caught under the third pin 230 initially. The trapping of a swing arm 228 in a notch under the third pin 230 may stop the release arm 224 from traveling upward, due to its attachment to the swing arms 228 by the third pin 230—thereby causing the first torsion spring 218 and the second torsion spring 225 to be held in tension. The tension of torsion of the first torsion spring 218 (in a clockwise direction in FIG. 2) may be overcome by the tension of torsion of the second torsion spring 225 (in a counterclockwise direction in FIG. 2)—this may tend to cause the pawl 214 to be pulled out of the teeth 217 of the ratchet 216. However, the tension caused by the constant torque spring 212 may cause the ratchet 216 and the pawl 214 to remain in place where they are unable to rotate (in a counterclockwise direction in FIG. 2) to release the pawl 214. To allow the load to rise, the release sequence may be completed by a user pushing down slightly on a load affixed to the lift cable 204. When this occurs, the tension holding the pawl 214 into the teeth 217 of the ratchet 216 may be momentarily released, as the lifting spool 215 rotates slightly (in a clockwise direction in FIG. 2). The tension on the pawl 214 caused by the second torsion spring 225 (in a counterclockwise direction in FIG. 2) may overcome the tension of the first torsion spring 218 (in a clockwise direction in FIG. 2), allowing the pawl 214 to rotate (in a counterclockwise direction in FIG. 2) and to disengage from the teeth 217 of the ratchet 216, where it continues to be held out of the teeth 217 by the tension of the second torsion spring 225. With the pawl 214 held away from the teeth 217 of the ratchet 216, the lifting spool 215 may be free to rotate (in a counterclockwise direction in FIG. 2) and to thereby wind the lift cable 204 about the cable spool 221—thereby raising the load to its stored (or another desired) position.

The unit of FIG. 2 may also include one or more cams 232 configured to engage with one or more of the swing arms 228. In this manner, if a cam 232 happens to be in a position close to a swing arm 228 as the load is pushed down, the cam 232 can contact a portion of the swing arm 228 (e.g., the semicircular portion shown in the figure) thereby pushing the swing arm 228 back and allowing the notch of the swing arm 228 to become free of the third pin 230. This, in turn, may allow the release arm 224 to rise, which would cause the pawl 214 to re-engage the ratchet 216 and prevent the load from rising. A second swing arm 228 may prevent this from occurring, however. As previously described, the notch in one swing arm 228 may be slightly lower than a notch in another, adjacent swing arm 228. Therefore, if a cam 232 happens to be in a position such that the slight downward movement of the load causes the storage spool 219 to rotate (in a counterclockwise direction in FIG. 2) and a cam 232 engages the semicircular portion of a swing arm 228 causing its notch to be disengaged, the release arm 224 may rise causing the pawl 214 to re-engage the ratchet 216 preventing the load from rising. However, when a swing arm 228 is disengaged from the third pin 230, the release arm 224 may rise but it may be stopped again by another notch of another swing arm 228 catching on the third pin 230. Therefore, the release arm 224 may only rise slightly, i.e., not enough to release the tension of the second torsion spring 225 tending to hold the pawl 214 away from the ratchet 216.

The cams 232 may be spaced apart, angularly around the storage spool 219 as shown in the figure. The preferred angular displacement may be about ninety degrees. The cams 232 may be structurally configured to rotate about their axels freely in a first direction (in a counterclockwise direction in FIG. 2) but may be stopped from rotating beyond their radial position when rotating in a second direction (in a clockwise direction in FIG. 2). One or more tension springs may hold the cams 232 in their respective radial position. As the cams 232 rotate (e.g., clockwise) with the storage spool 219, they may sequentially strike the swing arms 228. However, the cams 232 may be rotated in the opposite direction (e.g., counterclockwise) about their individual axels, as they strike the swing arms 228 and may not deflect the swing arms 228—this is the condition when the load is rising.

When the load is pulled down, the pawl 214 may re-engage the ratchet 216. In FIG. 2, during this condition, the storage spool 219 may be rotating counterclockwise, where the cams 232 may now strike the swing arms 228 but they are in their radial position and may try to rotate clockwise as they strike the swing arms 228, where one or more stops 234 on the storage spool 219 may prevent the cams 232 from rotating clockwise beyond their radial positions. Therefore, the cams 232 may deflect the swing arms 228 sequentially, as they contact the semicircular portions thereof, causing them to be forced out of the notches from the third pin 230 in sequence—thereby allowing the release arm 224 to rise, which may relieve the tension of the second torsion spring 225 trying to hold the pawl 214 away from the ratchet 216, causing the pawl 214 to be pressed against the ratchet 216, where it may ride on top of the teeth 217 of the ratchet 216 while the load is traveling down but engages the teeth 217 of ratchet 216 when the load tries to rise. The load can then be stopped at any position in its downward travel and remain approximately at the substantially same position. Typically, the load will be pulled down until it reaches an unload position near the floor where it is detached from the attachment device 180 such as that shown in FIG. 1.

Therefore, in one aspect, an overhead storage device includes: a cable pulley including a cable spool and a lift cable wound at least partially around the cable spool; an attachment mechanism disposed on an end of the lift cable, the attachment mechanism structurally configured to couple with a load; a constant torque spring unit engaged to the cable pulley and structurally configured to apply an approximately constant torque to the cable spool, the approximately constant torque promoting winding of the lift cable about the cable spool by biasing the cable spool towards rotation in a first direction; and a locking mechanism structurally configured to releasably lock rotation of the cable spool in the first direction while permitting rotation of the cable spool in a second direction opposite the first direction when a predetermined downward force is applied on the lift cable. The locking mechanism may include: a ratchet engaged with the cable spool and defining a plurality of teeth about a circumference thereof; a pawl having a distal end engageable with one or more of the plurality of teeth of the ratchet, where engagement of the distal end with one of the plurality of teeth prevents rotation of the cable spool along the first direction; a first torsion spring biasing the pawl toward the ratchet to promote engagement of the distal end with one or more of the plurality of teeth; a second torsion spring activatable to counteract biasing of the first torsion spring; and a release arm movable to activate the second torsion spring, where activation of the second torsion spring counteracts and overcomes biasing of the first torsion spring causing disengagement of the pawl with the ratchet thereby unlocking rotation of the cable spool along the first direction.

Dynamic Brake

A brake (which may be referred to herein as an inertial brake, a dynamic brake, or the like) will now be described. In general, the brake may be configured for use in an overhead storage device or system as described herein—e.g., with one or more of the components shown and described above with reference to FIGS. 1 and 2, or otherwise. Thus, a brake as disclosed herein may be part of an overhead storage system including a cable pulley and a constant torque spring unit coupled to the cable pulley, the constant torque spring unit structurally configured to apply an approximately constant torque to the cable pulley that promotes rotation thereof for winding of a lift cable and lifting of a load. And the brake may be engaged with a spool of one or more of the cable pulley and the constant torque spring unit for stopping or slowing the winding of the lift cable.

A user may generally control the rate of rise of the load as it ascends. However, if the user fails to control the rate of rise—and there is no load or a load much lighter than the lifting force of the device is present when the releasing two-step sequence is performed—the lift cable and the attachment device may tend to accelerate thereby increasing an upward velocity. In this manner, the lift cable or a component connected thereto may engage the storage unit (e.g., a connecting device may meet a docking collar of the overhead storage unit) at a potentially dangerously high velocity, e.g., causing one or more components to be damaged from a rapid stop and/or a collision. Under these conditions, it may also or instead be possible for a load attachment device (such as any as described herein) to catch or strike a user or a bystander possibly causing injury, or to otherwise cause damage or an unsafe condition. Although it may be difficult to cause a release with no load present, as it may require the user to pull down on a release cord and then pull down on the lift cable with substantial force, it may be possible. Therefore, a braking mechanism that limits acceleration and thereby velocity may be advantageously included in a system described herein. Specifically, to prevent a load or lift cable from ascending too quickly, an example technique is described herein that limits the rate of acceleration of the lift cable. That is, if the acceleration exceeds a predetermined level, it may cause the lift cable to come to a stop, or to otherwise slow its rate of winding. To this end, an acceleration of an ascent of the lift cable (e.g., an acceleration of winding of the lift cable, and thus a rotational acceleration of a spool upon which the lift cable is wound) above a predetermined threshold acceleration may trigger activation of a brake disclosed herein, and may utilize inertial forces created by such acceleration.

Figure 3:
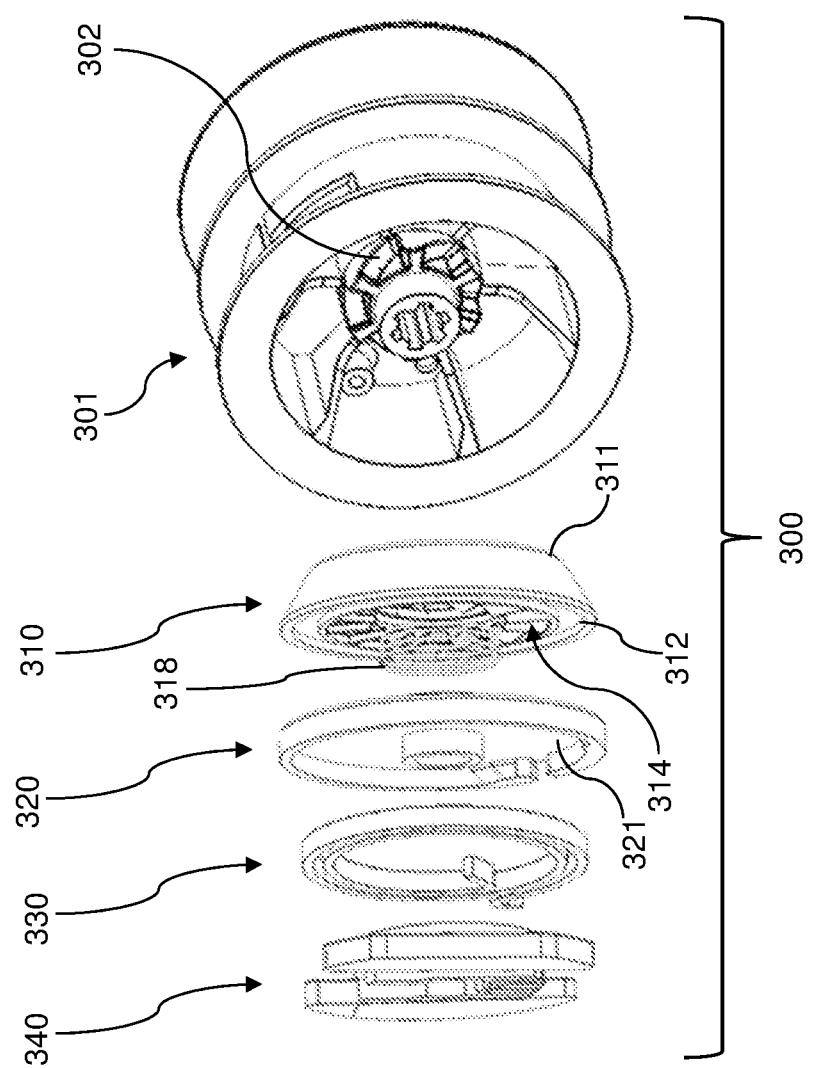
FIG. 3 illustrates an exploded view of an inertial brake of an overhead storage system, in accordance with a representative embodiment.
Figure 4:
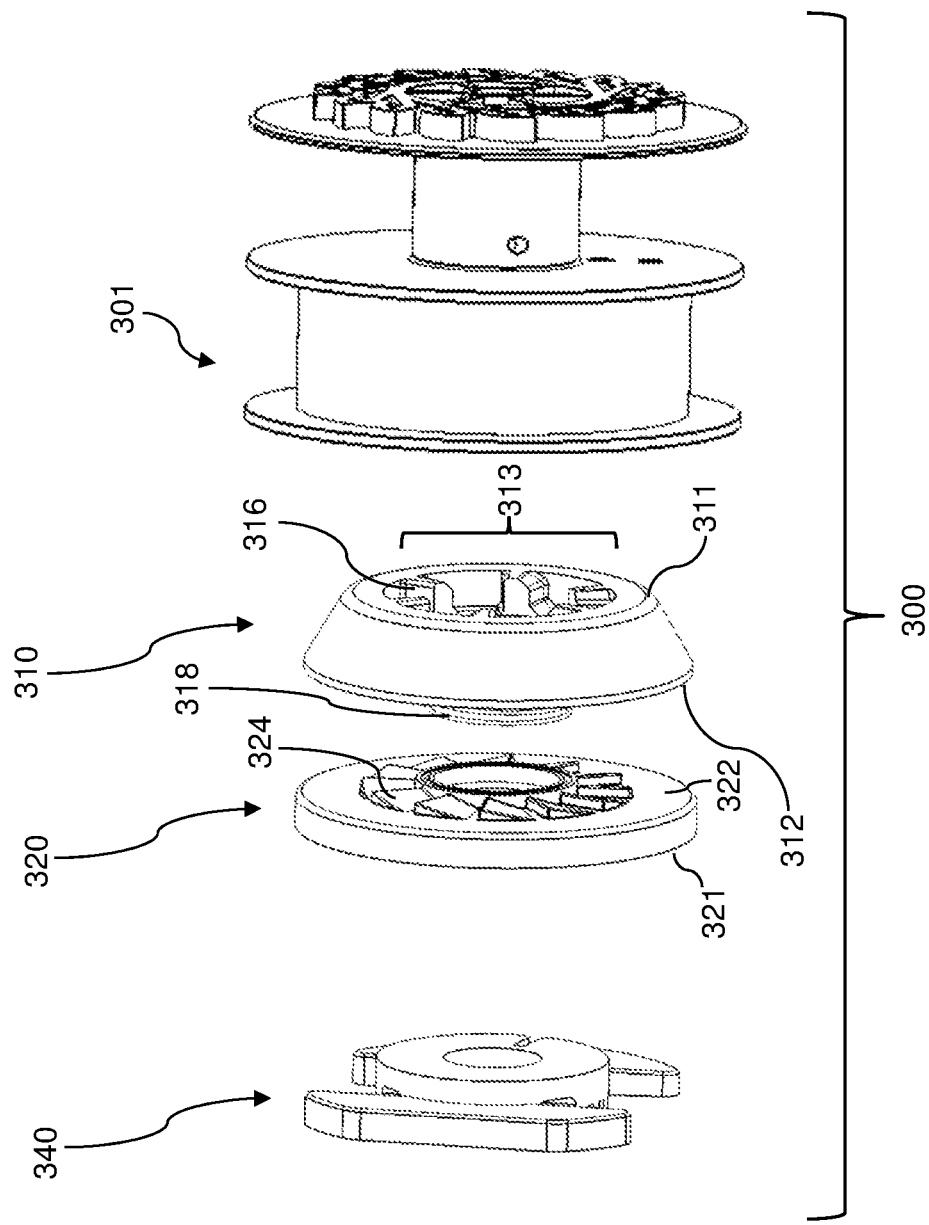
FIG. 4 illustrates an exploded view of an inertial brake of an overhead storage system, in accordance with a representative embodiment.

FIG. 3 illustrates an exploded view of an inertial brake of an overhead storage system, in accordance with a representative embodiment, and FIG. 4 illustrates an exploded view of an inertial brake of an overhead storage system, in accordance with a representative embodiment. In particular, FIGS. 3 and 4 show example embodiments of an inertial brake unit 300 structurally configured to prevent undesired speed and/or acceleration of a load being lifted or of the lift cable more generally. It will be understood that one or more of the elements of the brake unit 300 may be contained in the housing 106 of the system 100 of FIG. 1, and more particularly, in the lifting spool 215 (or another spool) of FIG. 2.

Turning back to FIGS. 3 and 4, the brake unit 300 may generally be engaged with a spool 301, e.g., a spool 301 of one or more of the cable pulley and the constant torque spring unit described herein, where the brake unit 300 is structurally configured to stop or slow the winding of a lift cable and thus a load connected thereto (directly or indirectly). For example, the spool 301 that is engaged with the brake unit 300 may be a lifting spool of the constant torque spring unit as described above. The brake unit 300 may generally include a rotor 310, a plate 320, a damper 330, and a fixed member 340.

The rotor 310 may be engaged with the spool 301 such that rotation of the rotor 310 generally corresponds to rotation of the spool 301. That is, the rotor 310 may be engaged with the spool 301 such that, when the rotor 310 stops rotating, so does the spool 301. The rotor 310 may generally include a first side 311 and a second side 312, where these sides may represent faces opposed to one another on the rotor 310 as shown in the figures, e.g., when the rotor 310 is disc-shaped. The first side 311 may include a first engagement area 313 structurally configured to engage with one or more engagement surfaces 302 disposed on the spool 301. In this manner, the first engagement area 313 of the rotor 310 may include one or more first rotor teeth 316 structurally configured to engage with one or more engagement surfaces 302 disposed on the spool 301. Correspondingly, the engagement surfaces 302 of the spool 301 may include one or more helical surfaces or the like sized and shaped to permit the first rotor teeth 316 to move along these surfaces in a predetermined manner when the rotor 310 is traversing between the first position and the second position. Thus, the rotor 310 may be movable along one or more of these engagement surfaces 302 of the spool 301 from a first position to a second position via an inertial force experienced by the rotor 310 from a predetermined rotation of the spool 301—e.g., a rate of rotation that is greater than a predetermined threshold rate. As explained herein, movement of the rotor 310 from its first position to the second position may trigger the brake unit 300 to stop or slow rotation of the spool 301 through corresponding engagement of the rotor 310 with other components of the brake unit 300 described in more detail below. Thus, the predetermined rotation of the spool 301 required to move the rotor 310 from the first position (e.g., a position further within the spool 301 than the second position) to the second position (e.g., a position disposed radially outward from the interior or hub of the spool 301) may be a relatively high speed that can generate the requisite inertial force to facilitate such movement. In this manner, only when a relatively high speed of winding of a lift cable occurs—generally, an undesirous situation for overhead storage devices—the brake unit 300 may cause the winding to slow or stop. The functioning of the brake unit 300 as described herein may occur in a relatively short period of time (e.g., less than one second) such that a human user may not even recognize that the brake unit 300 has been triggered. In certain aspects, rotation of the rotor 310 in a first direction opposite a direction of the predetermined rotation of the spool 301 causes the rotor 310 to move from the second position to the first position, thus resetting the brake unit 300. The rotor 310 may further include a second engagement area 314 on its second side 312, e.g., that is configured for mating with the plate 320 as described herein.

The plate 320 may similarly have a first side 321 and a second side 322. The first side 321 of the plate 320 may be structurally configured to be engaged with the fixed member 340 that can, at least in part, restrict rotation of the plate 320 or other components of the brake unit 300. The fixed member 340 may include a wall attachment plate/structure or the like—e.g., a structure that is configured to be attached to a structure of a housing or fixture (e.g., wall, beam, etc.), or that itself is such a fixture. The second side 322 of the plate 320 may include a mating surface 324 structurally configured for engagement with the second engagement area 314 of the rotor 310. That is, the mating surface 324 of the plate 320 and the second engagement area 314 of the rotor 310 may include cooperating surfaces and/or structures for mating or for other predetermined engagement with one another. It will generally be understood that surfaces or areas of the components of the brake unit 300 (or other components described herein) that are structurally configured for engagement may include one or more cooperating ramped surfaces, protrusions, indentations, voids, combinations thereof, and the like. For example, the mating surface 324 of the plate 320 may include one or more plate teeth as shown in FIG. 4, and the second engagement area 314 of the rotor 310 may include one or more second rotor teeth as shown in FIG. 3 structurally configured to engage with the plate teeth. In certain aspects, engagement of the plate teeth and the second rotor teeth may permit rotation of the rotor 310 in a first direction but may limit rotation of the rotor 310 in a second direction, e.g., where the second direction corresponds to the direction of the predetermined rotation of the spool 301 that triggers activation of the brake unit 300 (e.g., a winding direction).

The brake unit 300 may include a spring 318 disposed between the rotor 310 and the plate 320. The spring 318 may be sized, shaped, and positioned to bias the rotor 310 toward its first position, and to be compressible to allow movement of the rotor 310 to its second position where the mating surface 324 of the plate 320 engages with the second engagement area 314 of the rotor 310 to restrict rotation of the rotor 310. That is, engagement of the mating surface 324 of the plate 320 and the second engagement area 314 of the rotor 310 may restrict rotation of the rotor 310. Thus, when the rotor 310 traverses to its second position through an inertial force caused by acceleration above a threshold acceleration, the spring 318 may be compressed such that the mating surface 324 of the plate 320 engages with the second engagement area 314 of the rotor 310 thereby restricting rotation of the rotor 310. In this manner, the spring 318 can be selected to impact the predetermined threshold speed of rotation needed to allow movement of the rotor 310 to its second position to restrict rotation of the rotor 310 and activate the brake unit 300.

The damper 330 may be engaged with the plate 320 (e.g., on or within the first side 321 of the plate 320). The damper 330 may generally be structurally configured to absorb at least a portion of a torsional force applied by the rotor 310 to the plate 320. As shown in the figures, the damper 330 may include a spiral spring that is at least partially wound by this torsional force. In this manner, the rotation of the rotor 310 in its second position may cause rotation of the plate 320 until torque of the spiral spring damper 330 is substantially equal to the torsional force and torque exerted by the constant torque spring unit on the spool 301.

Thus, in operation, when lowering a load, as the spool 301 of FIG. 3 rotates counterclockwise in this example, the first rotor teeth 316 of the first engagement area 313 of FIG. 4 and the engagement surfaces 302 of the spool 301 in FIG. 3 may engage with their axially parallel surfaces pressing against each other, which tends to keep them engaged such that the rotor 301 will rotate together with the spool 301. This may be the condition when a load is lowered. When the load is raised, the spool 301 may rotate clockwise in this example, and the spool 301 may tend to accelerate due to the constant torque spring force being applied thereto. The rotor 310 may tend to remain stationary due to its inertia. However, the first engagement area 313 of the rotor 310 may include substantially helically-shaped surfaces on the first rotor teeth 316 (or other features on the first engagement area 313), such that cooperating helical surfaces of the engagement surfaces 302 of the spool 301 may, during clockwise rotation, cause the rotor 310 to tend to slide axially along a helical surface of the engagement surfaces 302 of the spool 301, which may move the rotor 310 to the left in the figure toward the plate 320, thereby compressing the spring 318 and moving the rotor 310 away from the spool 301. As the rotor 310 moves axially outward from the spool 301, the second engagement area 314 (e.g., teeth thereof) of the rotor 310 and the mating surface 324 of the plate 320 (e.g., cooperating teeth thereof) may engage. The spacing may be arranged such that, as these surfaces engage, teeth or other surface features thereof may slide against each other until the ends of their respective surfaces are reached and an axially parallel portion at the tip on the spool 301 is encountered limiting movement of the rotor 310 toward the plate 320. At this point, however, the second engagement area 314 and the mating surface 324 may be fully engaged, which stops the axial motion.

Because the second engagement area 314 and the mating surface 324 may be fully engaged, this may also tend to rotate the plate 320 clockwise from forces experience on the plate 320 from the rotor 310. This rotation may be countered by the damper 330—e.g., by winding it in an embodiment where the damper 330 is a spiral spring. The damper 330 may be housed in the plate 320, and it may include one end that is affixed to the plate 320 and another end that is affixed to the fixed member 340, for example, which may be affixed to a housing or the like. The damper 330 may thus resist the rotational force, e.g., where the winding of a spiral spring thereof resists the rotational force. The rotation of the plate 320 may continue until the torque of the damper 330 resisting clockwise rotation is equal to the force exerted by the net torque of the load on the spool 301 and the clockwise torque exerted by a constant torque spring on the spool 301. When these torques are equal, the rotation may stop thereby providing a brake action when a design threshold limit of acceleration is exceeded. This design threshold limit of acceleration may be determined by the inertia of the rotor 310 and the compression spring 318, which tends push the rotor 310 and the plate 320 apart. In this manner, the predetermined rotation of the spool 301 that triggers the brake unit 300 may be adjusted through selection and design of the components of the brake unit 300.

The damper 330 may transfer forces to the fixed member 340. For example, the winding up of a damper 330 when embodied as a spiral spring may transfer rotational forces to the fixed member 340. And the gradual winding up of a spiral spring or the like may allow the forces to be transferred gradually to the fixed member 340 and/or a housing connected thereto, thereby preventing a shock load to the components of the brake unit 300 or system, as they slowly absorb the stopping force(s). This may also or instead prevent too abrupt of a stop of the upward traveling load, which could otherwise bounce vigorously due to its upward momentum, or otherwise cause an undesirous condition. To continue raising the load with a controlled speed and acceleration, a user may pull down on the load, thereby reversing its direction. This may cause the rotor 310 to rotate clockwise (in this example) with respect to the spool 301 and to move axially to the right (in the figures) allowing the second engagement area 314 and the mating surface 324 to disengage—in some aspects, as the rotor 310 rotates clockwise, it will disengage from the plate 320. The compression spring 318 may tend to push the rotor 310 away from the plate 320 and into its fully engaged position with the spool 301. This short downward travel may fully disengage the brake unit 300 as the rotor 310 and the spool 301 rotate together counterclockwise. With the brake unit 300 fully disengaged, a user can then allow the load to continue its upward travel, while controlling the upward rate of travel and acceleration below the threshold of the brake unit 300.

It will be understood that an embodiment of the brake unit 300 may be binary—i.e., having two sates, a first state allowing the spool 301 to wind the lift cable and a second state that completely stops the spool 301 from rotating thereby preventing (further) winding of the lift cable. That is, in certain implementations, the brake unit 300 may not just slow down the spool 301—except possibly during the winding of the damper 330—but rather, its stopping of the spool 301 is substantially instantaneous. Thus, in an aspect, except during the winding of the damper 330, which may occur in mere milliseconds, the brake unit 300 immediately stops the spool 301 from rotating when it is activated. Other aspects of a brake unit 300 may include states between the aforementioned first state (where the spool 301 is free to rotate) and a second state (where the spool 301 is completely stopped from rotating), where the brake unit 300 slows the spool 301 in-between.

Therefore, a method disclosed herein may include: biasing a cable pulley of an overhead storage system toward winding a lift cable by providing, via a constant torque spring unit, an approximately constant torque on the cable pulley; and slowing or stopping the winding of the lift cable using a brake unit engaged with a spool of one or more of the cable pulley and the constant torque spring unit. The slowing or stopping of the winding of the lift cable using the brake unit may include: moving a rotor engaged with the spool from a first position to a second position for engagement with a plate having a mating surface, the plate engaged with a fixed member restricting rotation of the plate, wherein movement of the rotor is provided by an inertial force experienced by the rotor from a predetermined rotation of the spool caused by an acceleration greater than a predetermined threshold acceleration; engaging the rotor with the mating surface of the plate to restrict rotation of the rotor and the spool; and absorbing, via a damper, at least a portion of a torsional force applied by the rotor to the plate or the fixed member. The method may further include compressing a spring disposed between the rotor and the plate, the spring biasing the rotor toward its first position, and the spring compressible to allow for movement of the rotor to its second position where the mating surface of the plate engages with the rotor to restrict rotation of the rotor. The damper may include a spiral spring that is at least partially wound by the torsional force. The method may further include rotating the plate via the rotor until torque of the spiral spring is substantially equal to the torsional force and torque exerted by the constant torque spring unit on the spool. The method may further include moving the rotor from the second position to the first position to permit rotation of the spool. The method may further include rotating the rotor in a first direction opposite a direction of winding for the spool to cause the rotor to move from the second position to the first position.

Self-Coiling Cable

When a load has been lowered and detached from the lift cable (or more specifically, from an attachment device directly or indirectly coupled thereto), the lift cable and/or attachment device may remain hanging at substantially the position/height to which it was lowered. The presence of this cable and/or attachment device with no load attached can be inconvenient for a user. Therefore, an embodiment may include a self-coiling device that is structurally configured to be activated to raise the extended lift cable and/or attachment device to a height where it is out of the user's way, but otherwise easily retrieved. For example, it may be advantageous to include a technique that allows a user to raise the end of the lift cable and/or attachment device to a position where it is reachable by most users, but also not at a height that would be a hinderance to most users—such a height may be about five feet (about 1.5 meters) above a terminal lowered height of an end of the lift cable and/or attachment device, although other heights are also or instead possible. It will be understood that generally, in the context of the description of the self-coiling device, when one or more of the lift cable and attachment device are referred to as being raised to a desired height through the functioning of the self-coiling device, it shall also or instead include any desired winding performed by the self-coiling device, e.g., for lifting one or both of these elements and/or other elements disposed downstream of the self-coiling device.

Figure 5:
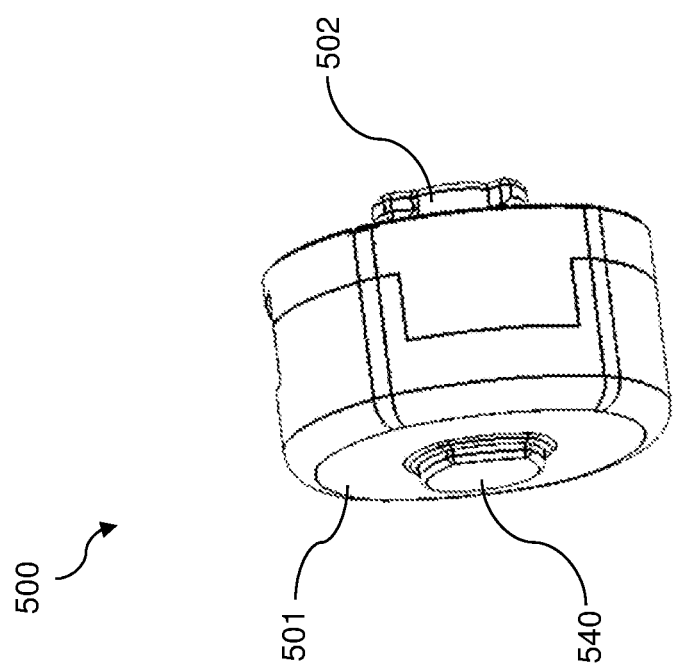
FIG. 5 illustrates a self-coiling device of an overhead storage system, in accordance with a representative embodiment.

FIG. 5 illustrates a self-coiling device of an overhead storage system, in accordance with a representative embodiment. That is, a self-coiling device 500 of FIG. 5 may raise a lift cable out of the way after the load is in its lowered position and detached. As shown in FIG. 5, the self-coiling device 500 may be comprised of components contained, wholly or partially, in a housing 501. The housing 501 may include a clamshell case or the like, with appropriate notches and voids for providing access for the lift cable and the like. The housing 501 may be adapted to include or to be coupled with a linkage 502 and an actuator 540. The linkage 502 may be structurally configured for engaging with a coupler or connector of another device (such as an attachment mechanism described herein, or a component to which an attachment mechanism is coupled). Thus, in this manner, the self-coiling device 500 can be indirectly coupled with a load.

Figure 6:
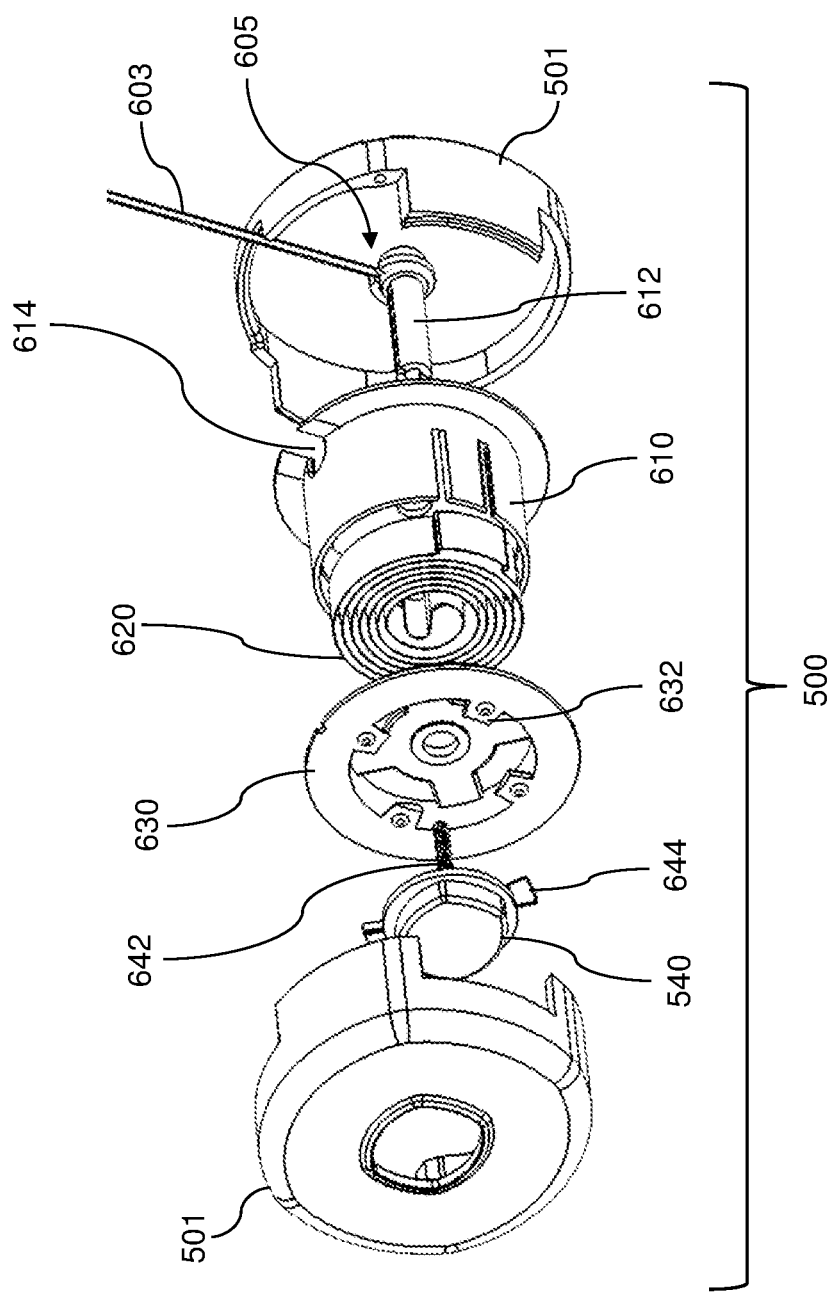
FIG. 6 illustrates an exploded view of a self-coiling device of an overhead storage system, in accordance with a representative embodiment.
Figure 7:
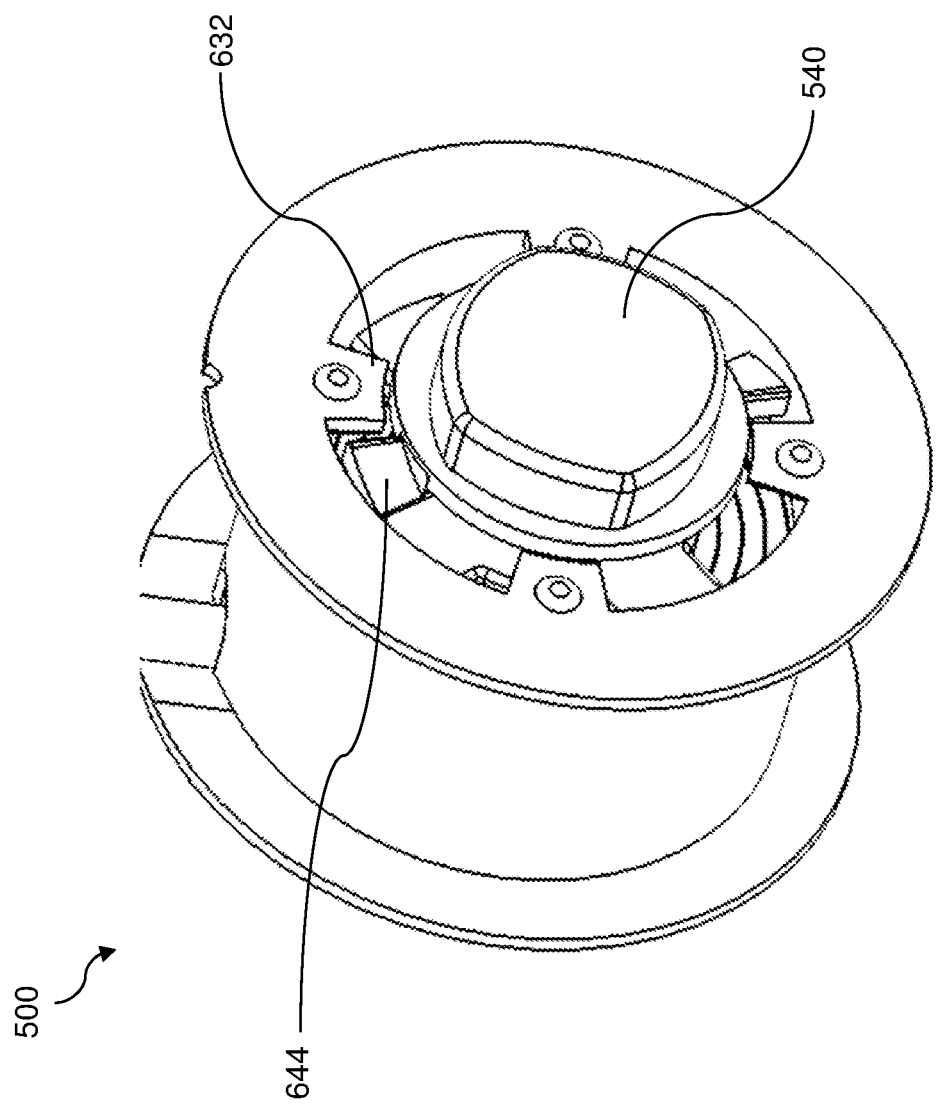
FIG. 7 illustrates a self-coiling device of an overhead storage system, in accordance with a representative embodiment.
Figure 8:
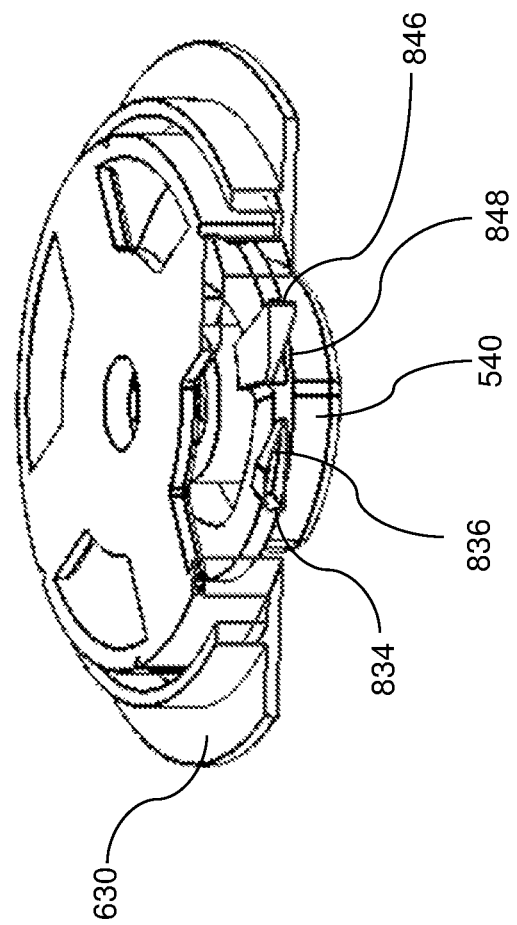
FIG. 8 illustrates a cutaway view of a self-coiling device of an overhead storage system, in accordance with a representative embodiment.
Figure 9:
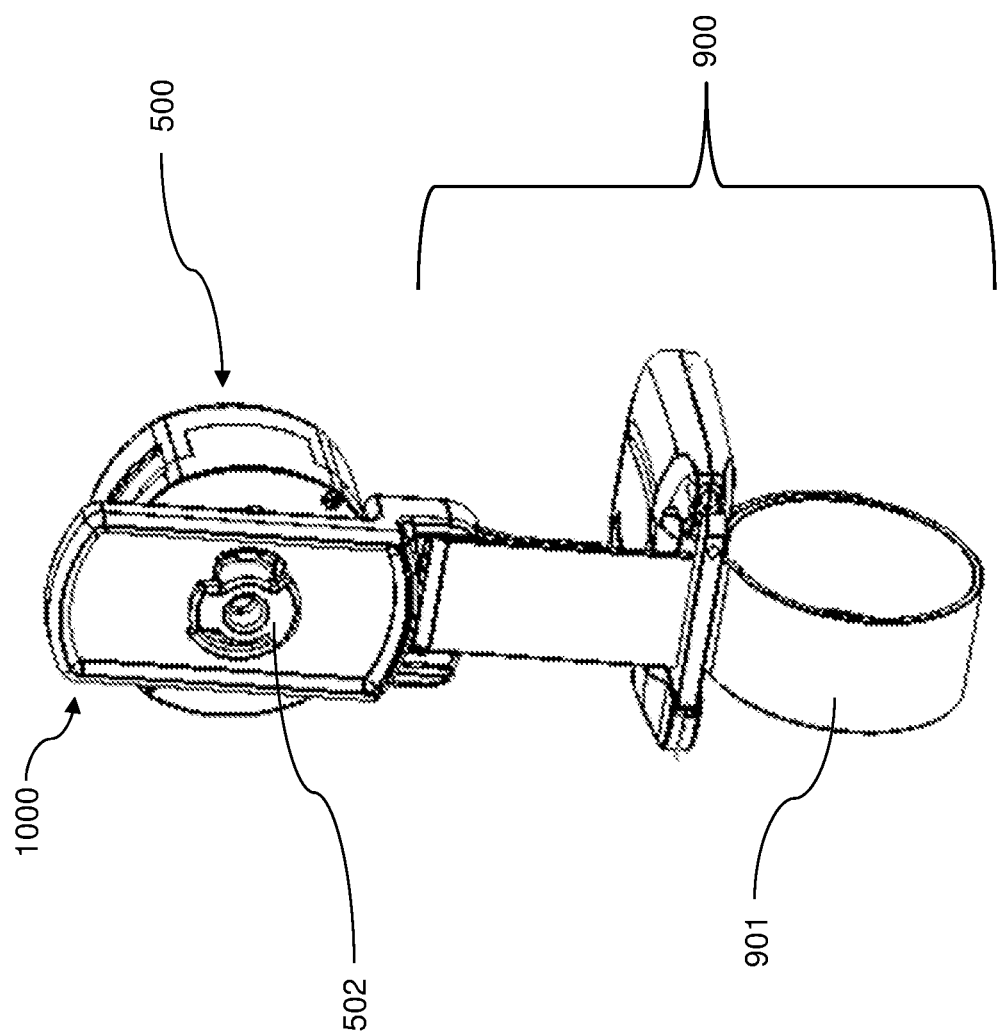
FIG. 9 illustrates a self-coiling device engaged with an attachment mechanism, in accordance with a representative embodiment.
Figure 10:
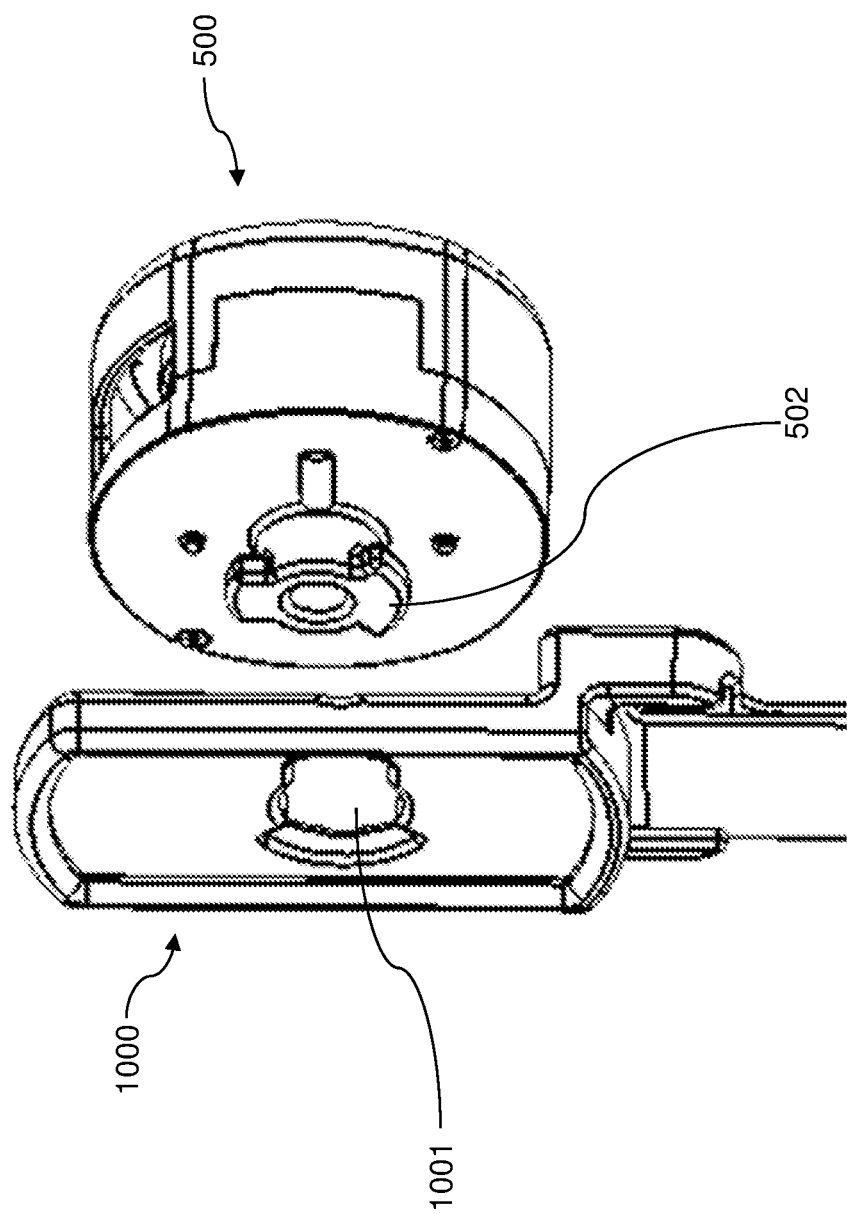
FIG. 10 illustrates a connector for attaching a load to a self-coiling device of an overhead storage system, in accordance with a representative embodiment.

Other views of the self-coiling device 500 are provided in FIGS. 6-9. Specifically, FIG. 6 illustrates an exploded view of a self-coiling device 500 of an overhead storage system, in accordance with a representative embodiment, FIG. 7 illustrates a self-coiling device 500 of an overhead storage system, in accordance with a representative embodiment, FIG. 8 illustrates a cutaway view of a self-coiling device of an overhead storage system, in accordance with a representative embodiment, and FIG. 9 illustrates a self-coiling device 500 engaged with an attachment mechanism, in accordance with a representative embodiment. In particular, FIGS. 5-9 shows an embodiment using a self-coiling device 500 to raise the lift cable to a height such that it is of the way when not in use, where this height may generally be disposed above a terminal unwound height for an overhead storage unit. It will be understood that the self-coiling device 500 may thus be included as part of an overhead storage system such as any of those described herein. For example, the self-coiling device 500 may be included as part of an overhead storage system including a cable pulley having a first cable spool (e.g., the cable spool 221 of FIG. 2) and a lift cable 603 (see FIG. 6) with a first end portion thereof coupled to the first cable spool. The cable pulley may be engaged with a constant torque spring unit structurally configured to apply an approximately constant torque to the first cable spool that promotes rotation of the first cable spool for winding of the lift cable 603 about the first cable spool. And, as best shown in FIG. 9, the self-coiling device 500 may be included in an overhead storage system including an attachment mechanism 900 engaged to the self-coiling device 500 and structurally configured to couple with a load. Moreover, as best shown in FIG. 10, the self-coiling device 500 may be included in an overhead storage system including a connector 1000 for attaching a load to the self-coiling device 500—e.g., indirectly—such that one or more accessories can be coupled to the self-coiling device 500 and thus the overhead storage system using such a connector 1000. Therefore, the self-coiling device 500 may be included as part of an overhead storage system including a constant torque spring unit such as any of those described herein.

As best shown in FIG. 6, the self-coiling device 500 may be coupled to a second end portion 605 of the lift cable 603, e.g., where an opposing first end portion of the lift cable 603 is attached to a cable spool of a cable pulley unit such as any of those described herein. It will be understood that the cable spool of a cable pulley unit or the like to which the opposing first end portion of the lift cable 603 is coupled may be referred to in this description of FIGS. 5-9 as a "first spool" or "first cable spool" for ease in differentiating the cable spool of the self-coiling device 500, which may be referred to herein as the "second spool 610" for convenience. Generally, the self-coiling device 500 may include a second spool 610, a spiral spring 620, a wheel 630, and the actuator 540.

The second spool 610 may be structurally configured to be the structure about which the lift cable 603 is windable. More specifically, the second spool 610 may be the component about which at least a portion of the lift cable 603 is windable. Thus, the second spool 610 may be rotatable in a first direction to unwind at least a portion of the lift cable 603 from the second spool 610 through a lowering of a self-coiling device 500 as part of an overhead storage system.

The spiral spring 620 may be coupled to the second spool 610 such that rotation of the second spool 610 in the first direction (i.e., the unwinding direction) causes a tensioning of the spiral spring 620. This tensioning of the spiral spring 620 may establish no greater than a maximum torque on the second spool 610, where this maximum torque may be selected to rotate the second spool 610 a predetermined amount in a second direction opposite the first direction and to thereby coil the lift cable 603 about the second spool 610 thereby raising the self-coiling device 500, which again, may be coupled to (e.g., hanging from) the second end portion 605 of the lift cable 603—i.e., the second direction may be a winding direction of the second spool 610.

The spiral spring 620 may be pre-wound backward from its relaxed state before it is inserted into the second spool 610. That is, when it is fabricated, it may be coiled clockwise (for example), but then it may be forced to coil counterclockwise, turning it inside out. The spiral spring 620 may be held with a band (or the like) around it and then placed into the second spool 610; the band (or the like) may then be slipped off, such that the spiral spring 620 will be biased toward expanding outwardly within the second spool 610. Then, when the spiral spring 620 coils about the central axel 612, the spiral spring 620 gets tighter around that axel. This winding backwards of the spiral spring 620 may create a near-constant torque.

The actuator 540 may be the device that is used to activate the self-coiling device 500 (e.g., to allow it to raise up to the desired height by a user, or at another height selected by a user). The actuator 540 may be movable from a first position where the second spool 610 is prevented from rotating in the second direction (winding direction) when the spiral spring 620 is tensioned to a second position where the second spool 610 is permitted to rotate in the second direction (winding direction) through a release of the tensioning of the spiral spring 620. The first position may correspond to an extended position, which may be the at-rest position (inactivated position) for the actuator 540, and the second position may correspond to a depressed position, which may be the activated position for the actuator 540. Thus, the first position of the actuator 540 may correspond to a locked or fixed position for the self-coiling device 500 and the second position of the actuator 540 may correspond to winding or moving condition for the self-coiling device 500.

The actuator 540 may be biased toward its first position, which again may correspond to a non-depressed or otherwise inactivated state, such that movement of the actuator 540 to the second position (a depressed or otherwise activated state) requires a force to overcome this biasing. To this end, the self-coiling device 500 may include a spring 642 that biases the actuator 540. Therefore, in certain aspects, applying a predetermined force on the actuator 540 may move the actuator 540 to the second position thereby causing a raising of the self-coiling device 500. Similarly, releasing this predetermined force on the actuator 540 may cause movement of the actuator 540 to the first position thereby selectively stopping the raising of the self-coiling device 500. That is, through selective application of a predetermined force or other engagement with the actuator 540, coiling and thus z-axis movement of the self-coiling device 500 can be controlled. As shown in the figures, the actuator 540 may include a button that is depressible by a user of the overhead storage system, although other configurations of the actuator 540 (e.g., configurations that are mechanical, electromechanical, electrical, digital, combinations thereof, and the like) are possible as will be understood by a skilled artisan.

The wheel 630 may be engaged with the second spool 610. Further, the actuator 540 may be engaged with the wheel 630 when the actuator 540 is in its first position to lock the wheel 630 and thereby the second spool 610 from rotating in the second direction (winding direction, whereby the self-coiling device 500 would be moving from a winding of the lift cable 603). To this end, moving the actuator 540 to the second position may unlock the wheel 630 and thereby the second spool 610 thus causing torque from the spiral spring 620 to rotate the second spool 610 thereby coiling the lift cable 603 about the second spool 610 and raising the self-coiling device 500.

Thus, an embodiment of the self-coiling device 500 may include the following. A spool (i.e., the second spool 610) may be positioned over a central axel 612 of the housing 501 or another fixed structure of the device or system, upon which the second spool 610 can rotate freely about. The spiral spring 620 may be wound inside the second spool 610 with an outermost end affixed to the second spool 610. The inner end of the spiral spring 620 may be secured to the housing 501 or another fixed structure, for example, by sliding it into a slot in the central axel 612. One end of the lift cable 603 (toward its second end portion 605) may be formed into a permanent loop, e.g., by fastening it to itself. This loop may be placed around the central axel 612, such that the looped end of the lift cable 603 can rotate about the central axel 612. While other engagement means are also or instead possible, the looping of the end of the lift cable 603 around the central axel 612 may be advantageous because it provides that, when the lift cable 603 is fully unwound from the second spool 610, the force of a load may be carried by the central axel 612 and thus the housing 501, which may be structurally configured to have sufficient strength to carry this load force that is applied through the lift cable 603.

A desired length of the lift cable 603 may be wound around the cylindrical surface of the second spool 610 by passing through a notch 614 in the second spool 610. In operation, and as the self-coiling device 500 is pulled downward, this action may unwind the lift cable 603 from the second spool 610 by rotating the second spool 610 clockwise, thereby causing the spiral spring 620 to be wound tighter about the central axel 612 or another rigid structure of the self-coiling device 500 or system generally. This may create a torque on the second spool 610, which will tend to rewind the lift cable 603 counterclockwise about the second spool 610 in response to the torque. Thereby, the self-coiling device 500 may raise itself up by coiling the lift cable 603 about the second spool 610 a length that may be determined by the tension created by the spiral spring 620.

The other end of the lift cable 603 (i.e., opposite the second end portion 605) may be affixed to a cable spool of the overall lifting system as described herein. To control the winding and unwinding of the lift cable 603 about the second spool 610, a button (i.e., the actuator 540) may engage the wheel 630, which is affixed to the second spool 610. In operation, a first tab 644 of the actuator 540 (or another feature on or engaged with the actuator 540) and second tab 632 of the wheel 630 (or another feature on or engaged with the wheel 630) may contact each other on their edges, which may be parallel to the central axel 612. This is shown in the cross-sectional view of FIG. 8, as a first edge surface 834 and a second edge surface 846. This engagement may prevent the second spool 610 from rotating because the actuator 540 may be held rotationally stationary by its position in the housing 501 (e.g., a first part of a clamshell case affixed to an opposing part of a clamshell case). When the self-coiling device 500 is pulled down, then the wheel 630 with the second spool 610 may try to rotate counterclockwise. In this direction, the first angled surfaces 836 and the second angled surfaces 848 shown in FIG. 8 may contact each other. These surfaces may be capable of sliding past each, e.g., by pulling the actuator 540, which may be held outward by the spring 642, toward the wheel 630 allowing the second angled surface 848 to slide past the first angled surface 836 when compressing the spring 642. This action may lower the first angled surface 836 as a user pulls on it, thereby winding the spiral spring 620 and unwinding the lift cable 603 from the second spool 610 such that it traverses toward a position (e.g., near the floor level) where a load is typically attached. In operation, the load may be attached by a strap 901 (see FIG. 9) that can enable the load to be attached while keeping the lift cable 603 fully unwound from the self-coiling device 500. With the load removed, activating the actuator 540 may cause the first tab 644 to be pushed under the second tab 632 such that substantially flat edges thereof can no longer contact each other, causing the second spool 610 to rotate clockwise and the lift cable 603 to be wound about the second spool 610 raising it until the tension of the spiral spring 620 is exhausted by its unwinding or until an operator releases activation of the actuator 540, which will re-engage the first tab 644 and the second tab 632, contacting each other on their edges parallel to the central axel 612, as before, stopping the rise of the self-coiling device 500 at the position it was when the actuator 540 deactivated (e.g., released)—for example, at arm's length above the user's head.

Therefore, a method disclosed herein may include: biasing a first cable spool of a cable pulley of an overhead storage system toward winding a lift cable about the first cable spool by providing, via a constant torque spring unit, an approximately constant torque on the first cable spool; unwinding the lift cable from the first cable spool by exerting a first downward force; unwinding at least a portion of the lift cable from a second spool on a self-coiling device disposed downstream from the first cable spool through application of one or more of the first downward force or a second downward force subsequently applied to the self-coiling device, the unwinding causing rotation of the second spool in a first direction; tensioning a spiral spring coupled to the second spool via the rotation of the second spool in the first direction, the tensioning of the spiral spring establishing no greater than a maximum torque on the second spool selected to rotate the second spool a predetermined amount in a second direction opposite the first direction; moving an actuator from a first position where the second spool is prevented from rotating in the second direction when the spiral spring is tensioned to a second position where the second spool is permitted to rotate; releasing the tensioning of the spiral spring; and rotating the second spool the predetermined amount in the second direction thereby coiling the lift cable about the second spool and raising the self-coiling device.

Accessory Connector

FIG. 9 illustrates a self-coiling device 500 engaged with an attachment mechanism 900, and FIG. 10 illustrates a connector 1000 for attaching a load to a self-coiling device 500 of an overhead storage system, in accordance with a representative embodiment. In particular, FIG. 10 shows an embodiment to attach a load to the self-coiling device 500, such as a bicycle, and hold it securely while being lifted and allowing for other accessories to be attached to the self-coiling device 500 or otherwise to a lift cable of an overhead storage system.

The self-coiling device 500 may be coupled to an accessory such as an attachment mechanism 900 (e.g., a strap 901 thereof) through a connector 1000. The coupling of the self-coiling device 500 to the connector 1000 may be established through a mechanical engagement—e.g., by features that are mechanically-keyed or otherwise structurally configured for secure engagement with one another. By way of example, the connector 1000 may define a void 1001, which itself may be sized and shaped (e.g., it may itself be a keyhole-shaped hole) for receiving and coupling with the linkage 502 of the self-coiling device 500. In one aspect, the connector 1000 may be attached to the self-coiling device 500 by rotating the void 1001 (e.g., key-shaped hole) in the connector 1000, such that the void 1001 of the connector 1000 is aligned with the linkage 502 (e.g., a key-shaped linkage 502) on the self-coiling device 500. Continuing with this example, the connector 1000 may be slid over the key-shaped linkage 502 of the self-coiling device 500 and rotated to lock it against the surface of the self-coiling device 500 with a longitudinal axis of the keyhole in the connector 1000 being substantially perpendicular to the longitudinal axis of the key-shaped linkage 502 of the self-coiling device 500. This connector 1000, with its void 1001, and the linkage 502 may securely hold the connector 1000 (and thus an accessory attached thereto, such as the attachment mechanism 900) onto the self-coiling device 500 or otherwise to the lift cable of an overhead storage system. The design of these components may also or instead allow for other accessories to be used to connect to the self-coiling device 500 (or otherwise to the overhead storage system/unit) using the same or similar concepts (e.g., the aforementioned interlocking keyhole and key shapes).

Clamp Attachment Device

Figure 11:
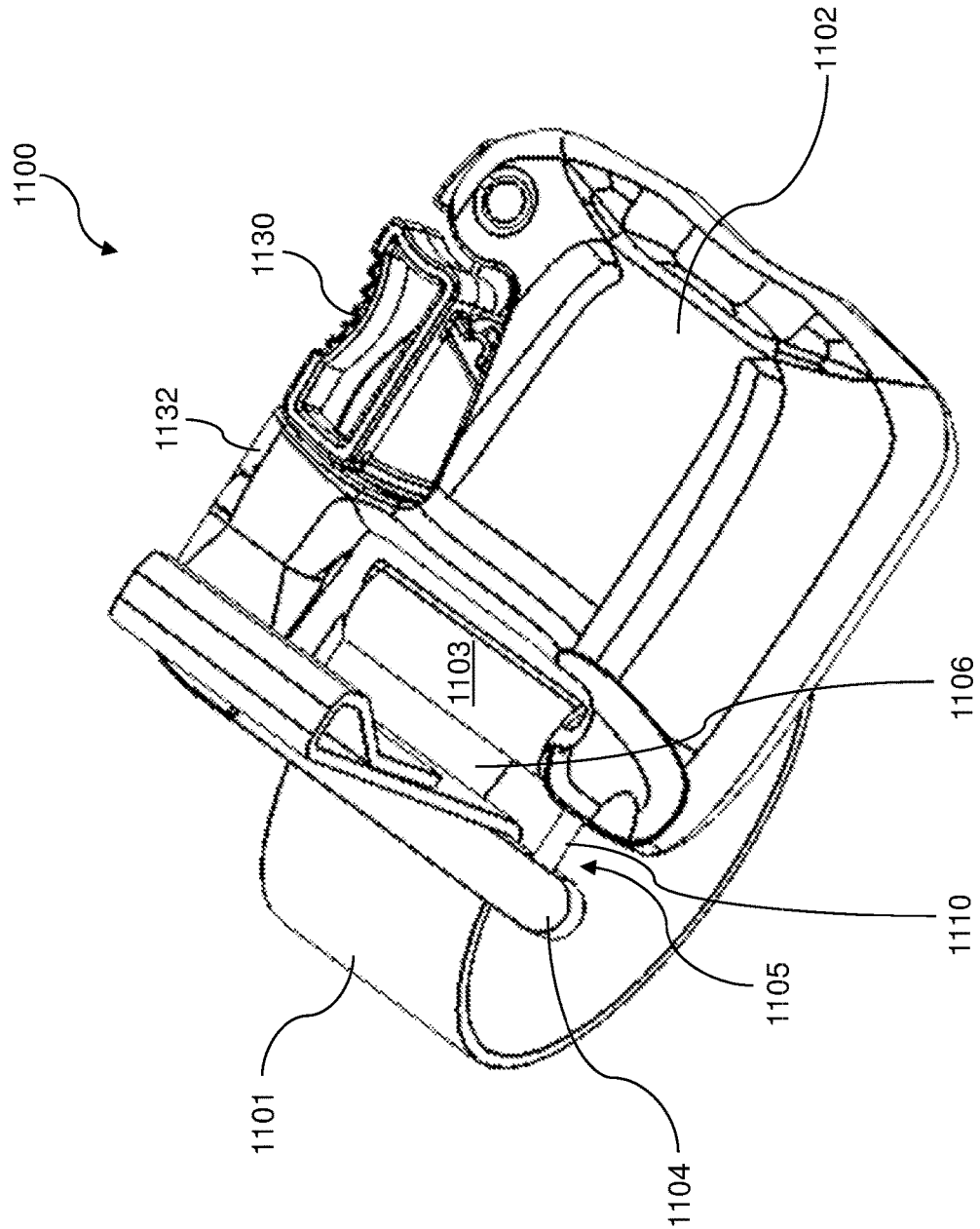
FIG. 11 illustrates an attachment mechanism for attaching a load to an overhead storage system, in accordance with a representative embodiment.
Figure 12:
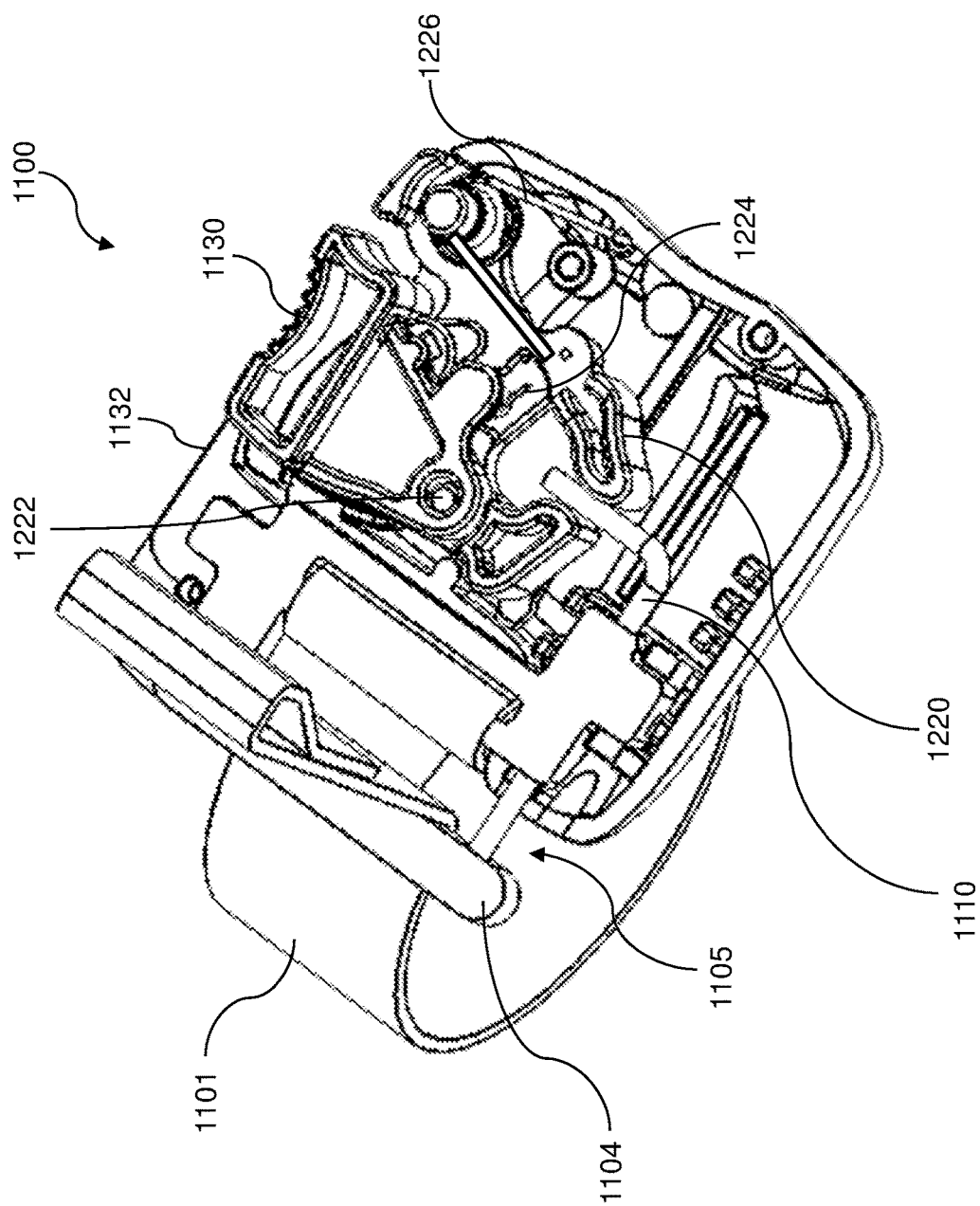
FIG. 12 illustrates internal components of an attachment mechanism for attaching a load to an overhead storage system, in accordance with a representative embodiment.

As discussed herein, a system disclosed herein may include one or more attachment mechanisms/devices. FIG. 11 illustrates an attachment mechanism for attaching a load to an overhead storage system, in accordance with a representative embodiment, and FIG. 12 illustrates internal components of an attachment mechanism for attaching a load to an overhead storage system, in accordance with a representative embodiment. In particular, FIGS. 11 and 12 show an embodiment to attach a load, such as a bicycle, and hold it securely while being lifted by an overhead storage device or system. To (relatively) easily attach a load such as a bicycle and or other load to such a lifting device, an attachment mechanism 1100 as disclosed herein may be used. The attachment mechanism 1100 may engage the cross bar of a bicycle (or other load with an attachment point), which can be encompassed by a strap 1101 of the attachment mechanism 1100, and may thus enable loads to be easily and quickly attached for raising and detached for use. Here, an embodiment according to FIGS. 11 and 12 is described that is relatively easy to use and intuitive to operate.

The attachment mechanism 1100 may be included as part of an overhead storage system such as any of those described herein. For example, such a system may include a cable pulley having a first cable spool and a lift cable having a first end portion coupled to the first cable spool, the cable pulley engaged with a constant torque spring unit structurally configured to apply an approximately constant torque to the first cable spool that promotes rotation of the first cable spool for winding of the lift cable about the first cable spool. The attachment mechanism 1100 may be disposed toward a second end portion of the lift cable and may be movable with the lift cable via the cable pulley. The attachment mechanism 1100 may generally include a strap 1101, a gate 1110 engageable with a fixed member 1104 such as a rigid bar or the like, a linkage 1220 (see FIG. 12), a button 1130, and a case 1102 that houses one or more of the components of the attachment mechanism 1100.

The strap 1101 may include a free end 1103 that is insertable and selectively lockable within a cavity 1106 of the attachment mechanism 1100. The strap 1101 may form a self-tensioning loop when the free end 1103 is locked within the cavity 1106 and a load is inserted within the loop.

The gate 1110 may be movable between an open position and a locked position, where it will be understood that the gate 1110 is in its locked position in each of FIGS. 11 and 12. The open position of the gate 1110 may expose an entryway 1105 providing access to the free end 1103 of the strap 1101 when the free end 1103 of the strap 1101 is disposed within the cavity 1106. The locked position of the gate 1110 may block the entryway 1105 as shown in the figures.

The linkage 1220 may be engaged with a portion of the gate 1110 such that rotational movement of the linkage 1220 moves the gate 1110 between its open position and its locked position.

The button 1130 may be engaged with the linkage 1220 as shown in FIG. 12. The button 1130 may be movable between a first position and a second position, where the linkage 1220 is movable with the button 1130 such that the first position corresponds to the locked position of the gate 1110 and the second position corresponds to the open position of the gate 1110. In certain implementations, each of the linkage 1220 and the button 1130 are pivotable about an axis 1222 disposed through a case 1102 of the attachment mechanism 1100. The attachment mechanism 1100 may further include a first spring 1224 biasing the button 1130 toward its first position. The attachment mechanism 1100 may further include a second spring 1226 biasing the linkage 1220 to move the gate 1110 into its locked position. The attachment mechanism 1100 may further include a tab 1132 (or other similar feature) on a case 1102 (or other structure) of the attachment mechanism 1100, where the tab 1132 restricts movement of the button 1130 within a predetermined range.

Thus, an attachment device 1100 may include a fixed member 1104 in the form of a connecting bar or the like, to which an end of the strap 1101—which may be made of a material that has a relatively high strength, is non-marring, but has a high friction coefficient, such as thermoplastic polyurethane coated strapping material—is affixed to a portion of the fixed member 1104 or other structure of the case 1102 or otherwise. The other end of the strap 1101 may be affixed to a connecting device as disclosed herein, and/or it may be directly attached to a lift cable. In operation, the gate 1110 may be held in a closed position where it is extended (e.g., through a hole or the like) in fixed member 1104 by a second spring 1226 that acts to rotate the button 1130 clockwise, in the example shown in FIG. 12. The button 1130 may hold the gate 1110 in a linkage 1220 connected thereto (or integral with the button), where such a linkage 1220 may include jaws or the like to facilitate such engagement. The strap 1101 may be held within the closed area formed by the gate 1110 and the fixed member 1104.

To ensure that the gate 1110 does not inadvertently retract through forces from the strap 1101 acting on it or otherwise, the button 1130 of the attachment mechanism 1100 may be formed as a locking button/structure. That is, the button 1130 may pivot about a pivot point located at an axis 1222 disposed through the case 1102 of the attachment mechanism 1100. A torsion spring (i.e., the first spring 1224) may bias the button 1130 toward rotating counterclockwise in the example shown in FIG. 12. This may cause a portion of the button 1130 to engage into a notch formed by the tab 1132 in the case 1102, or otherwise to abut against a fixed structure of the attachment mechanism 1100. When the gate 1110 tries to retract out of its locked position (e.g., a locked position within a hole in the fixed member 1104), it may be prevented by the button 1130 which cannot rotate, as it is held in place by the biasing forces and the tab 1132 (or another structure). To remove the strap 1101 from the closed section formed by the gate 1110 and the fixed member 1104, the button 1130 may be depressed by a user. When the button 1130 is depressed, it may rotate clockwise in the example shown in FIG. 12, which causes it to come out of the notch formed by the tab 1132 in the case 1102. The clockwise rotation of the button 1130 may cause the linkage 1220 to rotate counterclockwise in the example shown in FIG. 12, which causes the gate 1110 to be retracted from the fixed member 1104. This may allow the strap 1101 to slide out through the gap created and detach from a load such as a bicycle, which the strap 1101 may be wrapped around or otherwise engaging.

To attach a load such as a bicycle the user may grasp the case 1102 and depress the button 1130, which retracts the gate 1110. The strap 1101 may be wrapped around the load to be attached, such as the cross bar of a bicycle. The strap 1101 may then be slid into the gap, which is created when the button 1130 is depressed causing the gate 1110 to retract into the case 1102. The button 1130 may then be released, which captures the strap 1101 between sections of the fixed member 1104 and the gate 1110. The weight of the load, a bicycle for example, may cause the strap 1101 to tighten around the load. The strap 1101 may conform to the shape of the load to which it is attached and the weight of the load may tighten the strap 1101 around the load to hold it securely.

Listed Items

An overhead storage device for lifting and storing a load using a nearly constant torque spring mechanism without needing electricity or block and tackle type pulleys.

A method for allowing a constant torque spring to apply force to a load to lift it and to prevent the load from rising when it is being lowered to the unload position.

A release mechanism, which includes a two-step process, whereby the release cord is pulled down followed by the load being pushed down slightly to complete the disengagement of the mechanism preventing the rise of the load. Thereby, allowing the constant torque spring force to be applied to lift the load when it is desired.

A brake mechanism for the overhead storage device, which is initiated by the acceleration of the load and or its velocity to stop it from rising faster than a desired maximum speed.

A device for attaching the load to the lift cable of said lifting device, which uses a thermoplastic polyurethane coated strapping material, which prevents the load, for example a bicycle to be held in place firmly without scratching or marring the load bicycle to be lifted.

A mechanism for attaching the load, such as a bicycle to the lift cable that uses the weight of the load to self-tighten a strap around the load which attaches it to the lift cable, to hold it securely without slipping.

A device with a retractable rod and locking mechanism, which allows the securing strap to enter when retracted and trapped in the jaw of the device to keep the strap, and cannot be accidentally opened by the pressure or movement of the strap against the gate.

A mechanism for coiling the lift cable of the device to raise it out of the way when it is not in use to raise the load.

A connector which allows the lift cable and the load attachment device to be separated, such that load specific load attachments devices can be connected.

A keyhole and key shapes of a connector and self-coiler, which allows them to be attached and detached easily, while holding them together securely, when attached.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An overhead storage system, the system comprising:
a cable pulley;
a constant torque spring unit coupled to the cable pulley, the constant torque spring unit structurally configured to apply an approximately constant torque to the cable pulley that promotes rotation thereof for winding of a lift cable; and
a brake unit engaged with a spool of one or more of the cable pulley and the constant torque spring unit for slowing the winding of the lift cable, the brake unit comprising:
a rotor engaged with the spool such that rotation of the rotor corresponds to rotation of the spool, the rotor comprising:
a first side including a first engagement area structurally configured to engage with one or more engagement surfaces disposed on the spool, the rotor movable along the one or more engagement surfaces of the spool from a first position to a second position via an inertial force experienced by the rotor from a predetermined rotation of the spool; and
a second side including a second engagement area;
a plate having a first side engaged with a fixed member restricting rotation of the plate and a second side including a mating surface structurally configured for engagement with the second engagement area of the rotor;
a spring disposed between the rotor and the plate, the spring biasing the rotor toward its first position, and the spring compressible to allow movement of the rotor to its second position where the mating surface of the plate engages with the second engagement area of the rotor to restrict rotation of the rotor; and
a damper engaged with the plate, the damper structurally configured to absorb at least a portion of a torsional force applied by the rotor.

2. The system of claim 1, wherein the damper includes a spiral spring that is at least partially wound by the torsional force.

3. The system of claim 2, wherein the rotation of the rotor in its second position causes rotation of the plate until torque of the spiral spring is substantially equal to the torsional force and torque exerted by the constant torque spring unit on the spool.

4. The system of claim 1, wherein the first engagement area of the rotor includes one or more first rotor teeth.

5. The system of claim 4, wherein the one or more engagement surfaces of the spool include one or more helical surfaces sized and shaped to permit the one or more first rotor teeth to move along the one or more helical surfaces in a predetermined manner when traversing between the first position and the second position.

6. The system of claim 1, wherein the mating surface of the plate includes one or more plate teeth, and wherein the second engagement area of the rotor includes one or more second rotor teeth structurally configured to engage with the one or more plate teeth.

7. The system of claim 6, wherein engagement of the one or more plate teeth and the one or more second rotor teeth permits rotation of the rotor in a first direction but limits rotation of the rotor in a second direction, the second direction corresponding to the direction of the predetermined rotation of the spool.

8. The system of claim 1, wherein the spool engaged with the brake unit is a lifting spool of the constant torque spring unit.

9. The system of claim 1, wherein rotation of the rotor in a first direction opposite a direction of the predetermined rotation of the spool causes the rotor to move from the second position to the first position.

10. An overhead storage system, the system comprising:
a cable pulley including a first cable spool and a lift cable having a first end portion coupled to the first cable spool, the cable pulley engaged with a constant torque spring unit structurally configured to apply an approximately constant torque to the first cable spool that promotes rotation of the first cable spool for winding of the lift cable about the first cable spool;
a self-coiling device coupled to a second end portion of the lift cable, the self-coiling device comprising:
a second spool about which at least a portion of the lift cable is windable, the second spool rotatable in a first direction to unwind at least the portion of the lift cable from the second spool through a lowering of the self-coiling device;
a spiral spring coupled to the second spool such that rotation of the second spool in the first direction causes a tensioning of the spiral spring, the tensioning of the spiral spring establishing no greater than a maximum torque on the second spool selected to rotate the second spool a predetermined amount in a second direction opposite the first direction and to thereby coil the lift cable about the second spool thereby raising the self-coiling device; and
an actuator movable from a first position where the second spool is prevented from rotating in the second direction when the spiral spring is tensioned to a second position where the second spool is permitted to rotate in the second direction through a release of the tensioning of the spiral spring; and
an attachment mechanism engaged to the self-coiling device and structurally configured to couple with a load.

11. The system of claim 10, wherein the self-coiling device further comprises a wheel engaged with the second spool, and wherein the actuator is engaged with the wheel in the first position to lock the wheel and thereby the second spool from rotating in the second direction.

12. The system of claim 11, wherein moving the actuator to the second position unlocks the wheel and thereby the second spool thus causing torque from the spiral spring to rotate the second spool thereby coiling the lift cable about the second spool and raising the self-coiling device.

13. The system of claim 10, wherein the actuator is biased toward the first position, and wherein movement of the actuator to the second position requires a force to overcome this biasing.

14. The system of claim 13, wherein applying the force on the actuator moves the actuator to the second position thereby causing a raising of the self-coiling device, and wherein releasing the force on the actuator causes movement of the actuator to the first position thereby selectively stopping the raising of the self-coiling device.

15. The system of claim 10, wherein the actuator includes a button that is depressible by a user of the overhead storage system.

16. An overhead storage system, the system comprising:
a cable pulley including a first cable spool and a lift cable having a first end portion coupled to the first cable spool, the cable pulley engaged with a constant torque spring unit structurally configured to apply an approximately constant torque to the first cable spool that promotes rotation of the first cable spool for winding of the lift cable about the first cable spool; and
an attachment mechanism disposed toward a second end portion of the lift cable and movable with the lift cable via the cable pulley, the attachment mechanism comprising:
- a strap including a free end insertable and selectively lockable within a cavity of the attachment mechanism, the strap forming a self-tensioning loop when the free end is locked within the cavity and a load is inserted within the loop;
- a gate movable between an open position and a locked position, the open position exposing an entryway providing access to the free end of the strap when disposed within the cavity, and the locked position blocking the entryway;
- a linkage engaged with a portion of the gate such that rotational movement of the linkage moves the gate between the open position and the locked position; and
- a button engaged with the linkage, the button movable between a first position and a second position, and the linkage movable with the button such that the first position corresponds to the locked position of the gate and the second position corresponds to the open position of the gate.

17. The system of claim 16, wherein each of the linkage and the button are pivotable about an axis disposed through a case of the attachment mechanism.

18. The system of claim 16, further comprising a first spring biasing the button toward the first position.

19. The system of claim 16, further comprising a second spring biasing the linkage to move the gate into the locked position.

20. The system of claim 16, further comprising a tab on a case of the attachment mechanism, the tab restricting movement of the button within a predetermined range.

* * * * *